US012726968B2

(12) United States Patent
Yoon et al.

(10) Patent No.: US 12,726,968 B2
(45) Date of Patent: Sep. 1, 2026

(54) METHOD AND DEVICE FOR PROVIDING MULTICASTING AND BROADCASTING IN COMMUNICATION SYSTEM

(71) Applicant: Samsung Electronics Co., Ltd., Suwon-si (KR)

(72) Inventors: Suha Yoon, Suwon-si (KR); Euichang Jung, Suwon-si (KR); Hyunjung Kim, Suwon-si (KR); Seho Myung, Suwon-si (KR); Sungjin Park, Suwon-si (KR); Jeongho Yeo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 373 days.

(21) Appl. No.: 18/354,422

(22) Filed: Jul. 18, 2023

(65) Prior Publication Data

US 2024/0008023 A1 Jan. 4, 2024

Related U.S. Application Data

(63) Continuation of application No. PCT/KR2022/004732, filed on Apr. 1, 2022.

(30) Foreign Application Priority Data

Apr. 1, 2021 (KR) ........................ 10-2021-0042732

(51) Int. Cl.
*H04W 72/11* (2023.01)
*H04W 72/0446* (2023.01)

(52) U.S. Cl.
CPC ........ *H04W 72/11* (2023.01); *H04W 72/0446* (2013.01)

(58) Field of Classification Search
CPC ......................... H04W 72/0446; H04W 72/11; H04W 72/121
See application file for complete search history.

(56) References Cited

U.S. PATENT DOCUMENTS 9,973,315 B2 5/2018 Han et al.
10,506,574 B2 12/2019 Zhang et al.
(Continued)

FOREIGN PATENT DOCUMENTS

EP 3793280 A1 3/2021
KR 102196316 B1 12/2020
(Continued)

OTHER PUBLICATIONS

CATT, 'Discussion on group scheduling mechanism for RRC_ Connected UEs in MBS', R1-2100354, 3GPP TSG RAN WG1 Meeting #104-e, Jan. 19, 2021, Jan. 25-Feb. 5, 2020, 11 pages.
Intel Corporation, 'MBS MAC Layer and Group Scheduling Aspects', R2-2100361, 3GPP Tsgran WG2 Meeting #113-e, Jan. 15, 2021, Jan. 25-Feb. 5, 2021, 9 pages.
Intel Corporation, 'NR MBS Group Scheduling for RRC_ Connected UEs', R1-2100674, 3GPP TSG RAN WG1 Meeting #104-e, Jan. 19, 2021, Jan. 25-Feb. 5, 2021, 7 pages.
(Continued)

*Primary Examiner* — Brian D Nguyen
(74) *Attorney, Agent, or Firm* — NIXON & VANDERHYE P.C.

(57) ABSTRACT

The present disclosure relates to a 5G or 6G communication system for supporting a higher data transmission rate. According to the present disclosure, a method performed by a terminal in a communication system comprises: receiving semi persistent scheduling (SPS) configuration information from a base station; monitoring an SPS activation signal; confirming an SPS configuration corresponding to the SPS activation signal on the basis of the SPS configuration information, based on the SPS activation signal being sensed; receiving a physical downlink shared channel (PDSCH) from the base station on the basis of the SPS configuration; descrambling a PDSCH on the basis of a group-common configured scheduling radio network temporary identifier (CS-RNTI) based on the SPS configuration being a group-common SPS configuration; and descrambling the PDSCH on the basis of a terminal-specific CS-
(Continued)

RNTI based on the SPS configuration being a terminal-specific SPS configuration.

15 Claims, 20 Drawing Sheets

(56) References Cited

U.S. PATENT DOCUMENTS

| | | | | |
|---|---|---|---|---|
| 10,602,499 | B2 | 3/2020 | Lee et al. | |
| 10,764,920 | B2 | 9/2020 | Yerramalli et al. | |
| 11,044,730 | B2 | 6/2021 | Li et al. | |
| 11,601,964 | B2 | 3/2023 | Takeda et al. | |
| 2014/0086137 | A1 | 3/2014 | Chen | |
| 2019/0246420 | A1 | 8/2019 | Park et al. | |
| 2019/0349971 | A1 | 11/2019 | Yu et al. | |
| 2020/0295909 | A1 | 9/2020 | Liu et al. | |
| 2020/0359163 | A1 | 11/2020 | Kwon et al. | |
| 2021/0274535 | A1* | 9/2021 | Yi | H04W 24/08 |
| 2021/0307108 | A1* | 9/2021 | Babaei | H04W 76/18 |
| 2022/0078823 | A1* | 3/2022 | Li | H04W 72/0446 |
| 2023/0170969 | A1* | 6/2023 | Kim | H04L 1/0057 375/267 |
| 2023/0300829 | A1* | 9/2023 | Bae | H04W 72/1268 370/329 |
| 2023/0309090 | A1* | 9/2023 | Bae | H04L 1/1812 |
| 2023/0379032 | A1* | 11/2023 | Blankenship | H04W 72/232 |
| 2024/0089956 | A1* | 3/2024 | Bae | H04L 5/0048 |
| 2024/0106607 | A1* | 3/2024 | Prasad | H04W 72/121 |

FOREIGN PATENT DOCUMENTS

| | | |
|---|---|---|
| KR | 20220102956 A | 7/2022 |
| KR | 20220104544 A | 7/2022 |

OTHER PUBLICATIONS

International Search Report for PCT/KR2022/004732 mailed Jun. 29, 2022, 4 pages.

Written Opinion of the ISA for PCT/KR2022/004732 mailed Jun. 29, 2022, 4 pages.

Extended European Search Report dated Jun. 18, 2024 issued in European Patent Application No. 22781704.6.

3GPP TSG-RAN WG2, "MBS MAC Layer and Group Scheduling Aspects", Meeting Notes, Meeting #113, Jan. 25-Feb. 5, 2021, 7 pages.

3GPP TSG RAN WG1, "NR MBS Group Scheduling for RRC_ Connected UEs", Meeting Notes, Meeting #104, Jan. 25-Feb. 5, 2021, 9 pages.

ETSI MCC, R2-1712101, Report of 3GPP TSG RAN2#99bis meeting, Prague, Czech Republic, 3GPP TSG RAN WG2 #99bis dated Dec. 5, 2017.

LG Electronics Inc., R2-164217, Need of feedback for SPS activation, 3GPP TSG RAN WG2 #94 dated May 14, 2016.

Office Action dated Jan. 29, 2026, from the Korean Intellectual Property Office (KIPO) in connection with Korean application (with English language translation).

* cited by examiner

FIG. 17B 17-1b periodicity $k_0$ $k_0$

Processing time

Act. Sig.

SPS PDCSH

Act. Sig.

SPS PDCSH

SPS PDCSH

SPS PDCSH

Slot n

Slot m 1701 1702 1703 1704 1705 1706

17-2b periodicity $k_0$ $k_0$

Processing time

Act. Sig.

SPS PDCSH

Act. Sig.

SPS PDCSH

SPS PDCSH

SPS PDCSH

Slot n

Slot m 1701 1702 1703 1704 1705 1706

17-3b periodicity $k_0$ $k_0$

Processing time

Act. Sig.

SPS PDCSH

Act. Sig.

SPS PDCSH

SPS PDCSH

SPS PDCSH

Slot n

Slot m 1701 1702 1703 1704 1705 1706

METHOD AND DEVICE FOR PROVIDING MULTICASTING AND BROADCASTING IN COMMUNICATION SYSTEM

CROSS-REFERENCE TO RELATED APPLICATIONS

This application is a continuation of International Application No. PCT/KR2022/004732 designating the United States, filed on Apr. 1, 2022, in the Korean Intellectual Property Receiving Office and claiming priority to Korean Patent Application No. 10-2021-0042732, filed on Apr. 1, 2021, in the Korean Intellectual Property Office, the disclosures of each of which are incorporated by reference herein in their entireties.

BACKGROUND

Field

The disclosure relates to a mobile communication system, and for example, to a method of transmitting data to a plurality of terminals.

Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

Embodiments of the disclosure provide a method of configuring transmission and reception processing of a group common semi-persistent scheduling (SPS) physical downlink shared channel (PDSCH) and unicast SPS PDSCH in a communication system, and a method and device for transmitting and receiving an SPS configuration activation signal.

Embodiments of the disclosure provide a method and device for transmitting and receiving retransmission of an activation signal of a group-common SPS PDSCH in a communication system.

According to an example embodiment, a method performed by a terminal in a communication system includes: receiving, from a base station, semi persistent scheduling (SPS) configuration information; monitoring an SPS activation signal; identifying, based on the SPS activation signal being detected, an SPS configuration corresponding to the SPS activation signal based on the SPS configuration information; receiving, from the base station, a physical downlink shared channel (PDSCH) based on the SPS configuration; descrambling, based on the SPS configuration being a group-common SPS configuration, a PDSCH based on a group common configured scheduling radio network temporary identifier (CS-RNTI); and descrambling, based on the SPS configuration being a UE-specific SPS configuration, a PDSCH based on a user equipment (UE)-specific CS-RNTI.

According to an example embodiment, a method performed by a base station in a communication system includes: transmitting, to a terminal, semi persistent scheduling (SPS) configuration information; transmitting, to the terminal, an SPS activation signal; and transmitting a physical downlink shared channel (PDSCH) using an SPS configuration corresponding to the SPS activation signal identified based on SPS configuration information, wherein based on the SPS configuration being a group-common SPS configuration, the PDSCH is scrambled based on a group common configured scheduling radio network temporary identifier (CS-RNTI), and based on the SPS configuration being a user equipment (UE)-specific SPS configuration, the PDSCH is scrambled based on the UE-specific CS-RNTI.

According to an example embodiment, a terminal in a communication system includes: a transceiver; and a controller connected to the transceiver and configured to: receive, from a base station, semi persistent scheduling (SPS) configuration information, monitor an SPS activation signal, identify an SPS configuration corresponding to the SPS activation signal based on the SPS configuration information based on the SPS activation signal being detected, receive, from the base station, a physical downlink shared channel (PDSCH) based on the SPS configuration, descramble a PDSCH based on a group common configured scheduling radio network temporary identifier (CS-RNTI) based on the SPS configuration being a group-common SPS configuration, and descramble the PDSCH based on a user equipment (UE)-specific CS-RNTI based on the SPS configuration being a UE-specific SPS configuration.

According to an example embodiment, a base station in a communication system includes: a transceiver; and a controller connected to the transceiver and configured to: transmit semi persistent scheduling (SPS) configuration information to a terminal, transmit an SPS activation signal to the terminal, and transmit a physical downlink shared channel (PDSCH) using an SPS configuration corresponding to the SPS activation signal identified based on the SPS configuration information, wherein based on the SPS configuration being a group-common SPS configuration, the PDSCH is scrambled based on a group common configured scheduling radio network temporary identifier (CS-RNTI), and based on the SPS configuration being a user equipment (UE)-specific SPS configuration, the PDSCH is scrambled based on the UE-specific CS-RNTI.

According to various example embodiments of the disclosure, in the case that data is transmitted to a plurality of terminals through a group-common SPS PDSCH and/or a unicast SPS PDSCH in a communication system, by providing a method of configuring the SPS PDSCHs and a method of transmitting and receiving an SPS configuration activation signal, more efficient data transmission and reception can be performed.

According to various example embodiments of the disclosure, by providing a method of transmitting and receiving retransmission of an activation signal of a group-common SPS PDSCH, a terminal and a base station can smoothly communicate.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 17B is a diagram illustrating an example retransmitted SPS activation signal and timing of an SPS PDSCH according to various embodiments;

DETAILED DESCRIPTION

Figure 1:
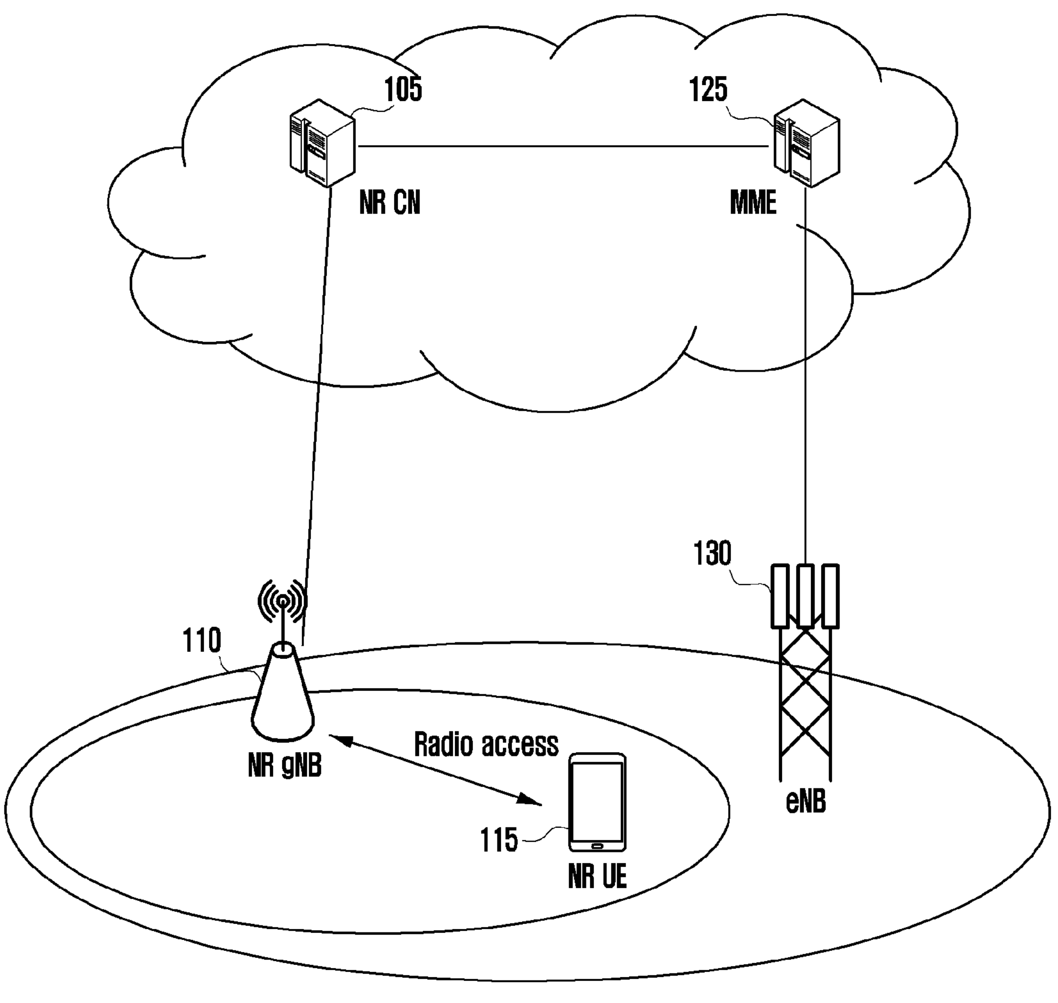
FIG. 1 is a diagram illustrating an example structure of a next generation mobile communication system according to various embodiments.

Hereinafter, various example embodiments of the disclosure will be described in greater detail with reference to the accompanying drawings.

In describing the various example embodiments, descriptions of technical contents that are well known in the technical field to which the disclosure pertains and that are not directly related to the disclosure may be omitted. This is to more clearly convey the gist of the disclosure without obscuring the gist of the disclosure by omitting unnecessary description.

For the same reason, some components are exaggerated, omitted, or schematically illustrated in the accompanying drawings. Further, the size of each component does not fully reflect the actual size. In each drawing, the same reference numerals are given to the same or corresponding components.

Advantages and features of the disclosure, and a method of achieving them will become apparent with reference to the various example embodiments described below in detail in conjunction with the accompanying drawings. However, the disclosure is not limited to the embodiments disclosed below, but may be implemented in various different. Like reference numerals refer to like components throughout the disclosure.

It will be understood that each block of flowcharts and combinations of the flowcharts may be performed by computer program instructions. Because these computer program instructions may be mounted in a processor of a general purpose computer, special purpose computer, or other programmable data processing equipment, the instructions performed by a processor of a computer or other programmable data processing equipment generate a may refer, for example, to performing functions described in the flowchart block(s). Because these computer program instructions may be stored in a computer usable or computer readable memory that may direct a computer or other programmable data processing equipment in order to implement a function in a particular manner, the instructions stored in the computer usable or computer readable memory may produce a production article containing instruction means for performing the function described in the flowchart block(s). Because the computer program instructions may be mounted on a computer or other programmable data processing equipment, a series of operation steps are performed on the computer or other programmable data processing equipment to generate a computer-executed process; thus, instructions for performing the computer or other programmable data processing equipment may provide steps for performing functions described in the flowchart block(s).

Further, each block may represent a portion of a module, a segment, or a code including one or more executable instructions for executing a specified logical function(s). Further, it should be noted that in some alternative implementations, functions recited in the blocks may occur out of order. For example, two blocks illustrated one after another may in fact be performed substantially simultaneously, or the blocks may be sometimes performed in the reverse order according to the corresponding function.

In this case, the term '-unit' used in this embodiment may refer, for example, to software or hardware components such as field programmable gate array (FPGA) or application specific integrated circuit (ASIC), and '-unit' performs certain roles. However, '-unit' is not limited to software or hardware. '-unit' may reside in an addressable storage medium or may reproduce one or more processors. Therefore, according to various embodiments, '-unit' includes components such as software components, object-oriented software components, class components, and task components, processes, functions, properties, procedures, subroutines, segments of program code, drivers, firmware, microcode, circuit, data, databases, data structures, tables, arrays, and variables. Functions provided in the components and '-units' may be combined into a smaller number of components and '-units' or may be further separated into additional components and '-units'. Further, components and '-units' may be implemented to reproduce one or more CPUs in a device or secure multimedia card. Further, according to various embodiments, '-unit' may include one or more processors.

Hereinafter, the disclosure will be described in greater detail with reference to the accompanying drawings. In the following description, in describing the disclosure, in the case that it is determined that a detailed description of a related well-known function or constitution may unnecessarily obscure the gist of the disclosure, a detailed description thereof may be omitted. Terms described below are terms defined in consideration of functions in the disclosure, which may vary according to intentions or customs of users and providers. Therefore, the definition should be made based on the content throughout this disclosure. Hereinafter, a base station is a subject performing resource allocation of a terminal, and may include at least one of a gNode B, an eNode B, a node B, a base station (BS), a radio access unit, a base station controller, or a node on a network. The terminal may include a user equipment (UE), a mobile station (MS), a cellular phone, a smart phone, a computer, or a multimedia system capable of performing a communication function. The disclosure is not limited to the above examples. Hereinafter, the disclosure describes technology for a terminal to receive broadcast information from a base station in a wireless communication system. The disclosure relates to a communication technique that converges a 5th generation (5G) communication system for supporting higher data rates after a 4th generation (4G) system with Internet of Things (IoT) technology, and a system thereof. The disclosure may be applied to intelligent services (e.g., smart home, smart building, smart city, smart car or connected car, healthcare, digital education, retail business, security and safety-related services and the like) based on 5G communication technology and IoT-related technology.

Terms referring to broadcast information, terms referring to control information, terms related to communication coverage, terms (e.g., event) referring to state changes, terms referring to network entities, terms referring to messages, and terms referring to components of a device used in the following description are illustrated for convenience of description. Accordingly, the disclosure is not limited to the terms described below, and other terms having an equivalent technical meaning may be used.

Hereinafter, for convenience of description, some terms and names defined in the 3rd generation partnership project long term evolution (3GPP) standard or 3GPP new radio (NR or new radio access technology) may be used. However, the disclosure is not limited by the above terms and names, and may be equally applied to systems conforming to other standards.

FIG. 1 is a diagram illustrating an example structure of a next generation mobile communication system according to various embodiments.

With reference to FIG. 1, a radio access network of a next generation mobile communication system (hereinafter, referred to as NR or 5G) may include a new radio node B (hereinafter, referred to as an NR gNB or NR base station) 110 and a new radio core network (NR CN) 105. A new radio user equipment (NR UE or terminal) 115 may access an external network through the NR gNB 110 and the NR CN 105.

In FIG. 1, the NR gNB 110 may correspond to an evolved node B (eNB) of the existing LTE system. The NR gNB may be connected to the NR UE 115 through a radio channel and provide more advanced services than the existing node B. In the NR, all user traffic may be serviced through a shared channel. Therefore, a device for collecting and scheduling status information such as a buffer status, available transmission power status, and channel status of UEs is required, and the NR gNB 110 may take charge of this. One NR gNB may control multiple cells. In the NR, in order to implement ultra-high speed data transmission compared to current LTE, a bandwidth higher than the current maximum bandwidth may be applied. Further, a beamforming technology may be additionally applied using orthogonal frequency division multiplexing (OFDM) as a radio access technology. Further, an adaptive modulation & coding (hereinafter, referred to as AMC) scheme for determining a modulation scheme and a channel coding rate according to a channel state of a UE may be applied.

The NR CN 105 may perform functions such as mobility support, bearer configuration, and QoS configuration. The NR CN is a device in charge of various control functions as well as a mobility management function for a UE, and may be connected to a plurality of base stations. Further, the NR may be interworked with the existing LTE system, and the NR CN may be connected to an MME 125 through a network interface. The MME may be connected to an eNB 130, which is the existing base station.

Figure 2:
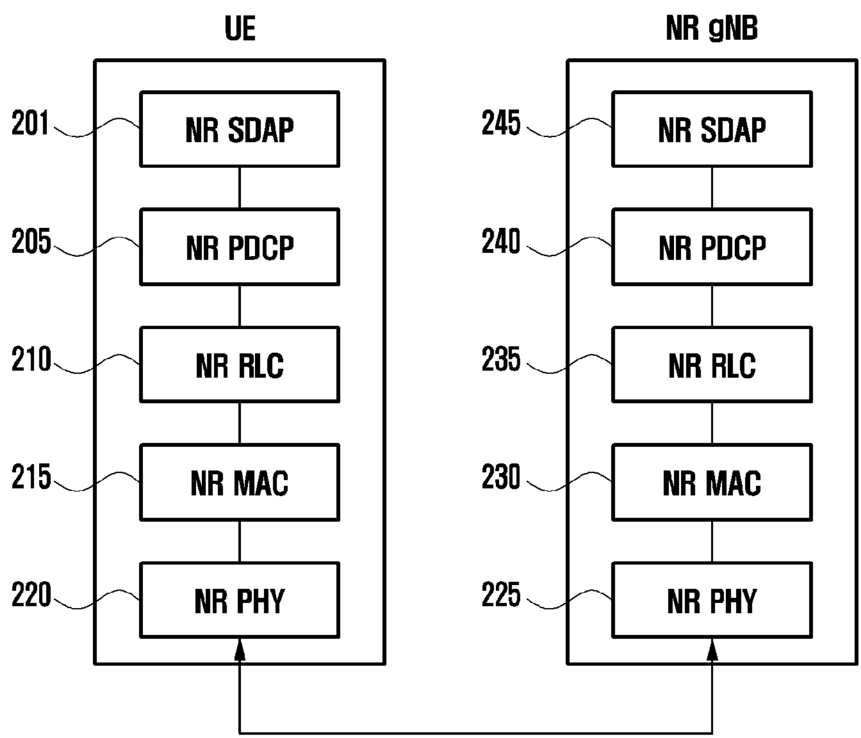
FIG. 2 is a block diagram illustrating an example radio protocol structure of a next generation mobile communication system according to various embodiments.

FIG. 2 is a block diagram illustrating an example radio protocol structure of NR according to various embodiments.

With reference to FIG. 2, radio protocols of the NR include NR service data adaptation protocols (SDAPs) 201 and 245, NR packet data convergence protocols (PDCPs) 205 and 240, NR RLCs 210 and 235, NR medium access controls (MAC) 215 and 230, and NR physicals (PHYs) 220 and 225 in the UE and the NR base station, respectively.

Functions of the NR SDAPs 201 and 245 may include some of the following functions.

- transfer of user plane data
- mapping between a QoS flow and a DRB for both DL and UL
- marking QoS flow ID in both DL and UL packets
- reflective QoS flow to DRB mapping for the UL SDAP PDUs.

For the SDAP layer device, the UE may receive a configuration on whether to use a header of the SDAP layer device or whether to use a function of the SDAP layer device for each PDCP layer device, each bearer, or each logical channel with a radio resource control (RRC) message. In the case that the SDAP header is configured, the UE may be instruct to update or reconfigure mapping information on uplink and downlink QoS flows and data bearers with non-access stratum (NAS) reflective quality of service (QoS) and access stratum (AS) reflective QoS of the SDAP header. The SDAP header may include QoS flow ID information indicating a QoS. QoS information may be used as a data processing priority and scheduling information for supporting a smooth service.

Functions of the NR PDCPs 205 and 240 may include some of the following functions.

- Header compression and decompression: ROHC only
- Transfer of user data
- In-sequence delivery of upper layer PDUs
- Out-of-sequence delivery of upper layer PDUs
- PDCP PDU reordering for reception
- Duplicate detection of lower layer SDUs
- Retransmission of PDCP SDUs
- Ciphering and deciphering
- Timer-based SDU discard in uplink.

In the above description, reordering of the NR PDCP device may refer to a function of reordering PDCP PDUs received from a lower layer based on a PDCP sequence number (SN). The reordering of the NR PDCP device may include a function of delivering data to a higher layer in the rearranged order, a function of directly delivering data without considering the order, and a function of rearranging the order and recording lost PDCP PDUs, a function of reporting a status of lost PDCP PDUs to the transmitting side, and a function of requesting retransmission of lost PDCP PDUs.

Functions of the NR RLCs 210 and 235 may include some of the following functions.

- Transfer of upper layer PDUs
- In-sequence delivery of upper layer PDUs
- Out-of-sequence delivery of upper layer PDUs
- Error Correction through ARQ
- Concatenation, segmentation and reassembly of RLC SDUs
- Re-segmentation of RLC data PDUs
- Reordering of RLC data PDUs
- Duplicate detection
- Protocol error detection
- RLC SDU discard
- RLC re-establishment In the above description, the in-sequence delivery of the NR RLC device may refer to a function of sequentially delivering RLC SDUs received from a lower layer to an upper layer. In the case that one RLC SDU is originally divided into several RLC SDUs and received, the in-sequence delivery of the NR RLC device may include a function of reassembling and delivering the several RLC SDUs.

The in-sequence delivery of the NR RLC device may include a function of rearranging received RLC PDUs based on an RLC sequence number (SN) or a PDCP SN and a function of reordering the received RLC PDUs and recording lost RLC PDUs, a function of reporting a status of lost RLC PDUs to the transmitting side, and a function of requesting retransmission of lost RLC PDUs.

In-sequence delivery of the NR RLC 210 and 235 devices may include a function of sequentially delivering only RLC SDUs prior to the lost RLC SDU to the upper layer in the case that there is a lost RLC SDU. Further, the in-sequence delivery of the NR RLC device may include a function of sequentially delivering all RLC SDUs received before the timer starts to the upper layer, if a predetermined timer expires, even if there is a lost RLC SDU. Further, the in-sequence delivery of the NR RLC device may include a function of sequentially delivering all RLC SDUs received so far to the upper layer, if a predetermined timer expires, even if there is a lost RLC SDU.

The NR RLC 210 and 235 devices may process RLC PDUs in the received order regardless of the order of sequence numbers (out of sequence delivery) and deliver the RLC PDUs to the NR PDCPs 205 and 240 devices.

In the case that the NR RLC 210 and 235 devices receive a segment, the NR RLC 210 and 235 devices may receive segments stored in the buffer or to be received later, reconstitute the segments one complete RLC PDU, and then transmit the one complete RLC PDU to the NR PDCP device.

The NR RLC layer may not include a concatenation function, but may perform the function in the NR MAC layer or may be replaced the function with a multiplexing function of the NR MAC layer.

In the above description, the out-of-sequence delivery of the NR RLC device may refer, for example, to a function of directly delivering RLC SDUs received from a lower layer to an upper layer regardless of order. The out of sequence delivery of the NR RLC device may include a function of reassembling and delivering several RLC SDUs in the case that one RLC SDU is originally divided into several RLC SDUs and received. The out of sequence delivery of the NR RLC device may include a function of storing RLC SNs or PDCP SNs of received RLC PDUs and a function of reordering the RLC SNs or PDCP SNs and recording lost RLC PDUs.

The NR MACs 215 and 230 may be connected to several NR RLC layer devices in one UE, and main functions of the NR MAC may include some of the following functions.

- Mapping between logical channels and transport channels
- Multiplexing/demultiplexing of MAC SDUs
- Scheduling information reporting
- Error correction through HARQ (hybrid automatic repeat request)
- Priority handling between logical channels of one UE
- Priority handling between UEs by means of dynamic scheduling
- MBMS service identification
- Transport format selection
- Padding The NR PHY layers 220 and 225 may channel-code and modulate higher layer data and make OFDM symbols to transmit the OFDM symbols through a radio channel or demodulate and channel-decode OFDM symbols received through a radio channel to deliver the OFDM symbols to a higher layer.

Hereinafter, a frame structure of the 5G system will be described in more detail with reference to the drawings.

Figure 3:
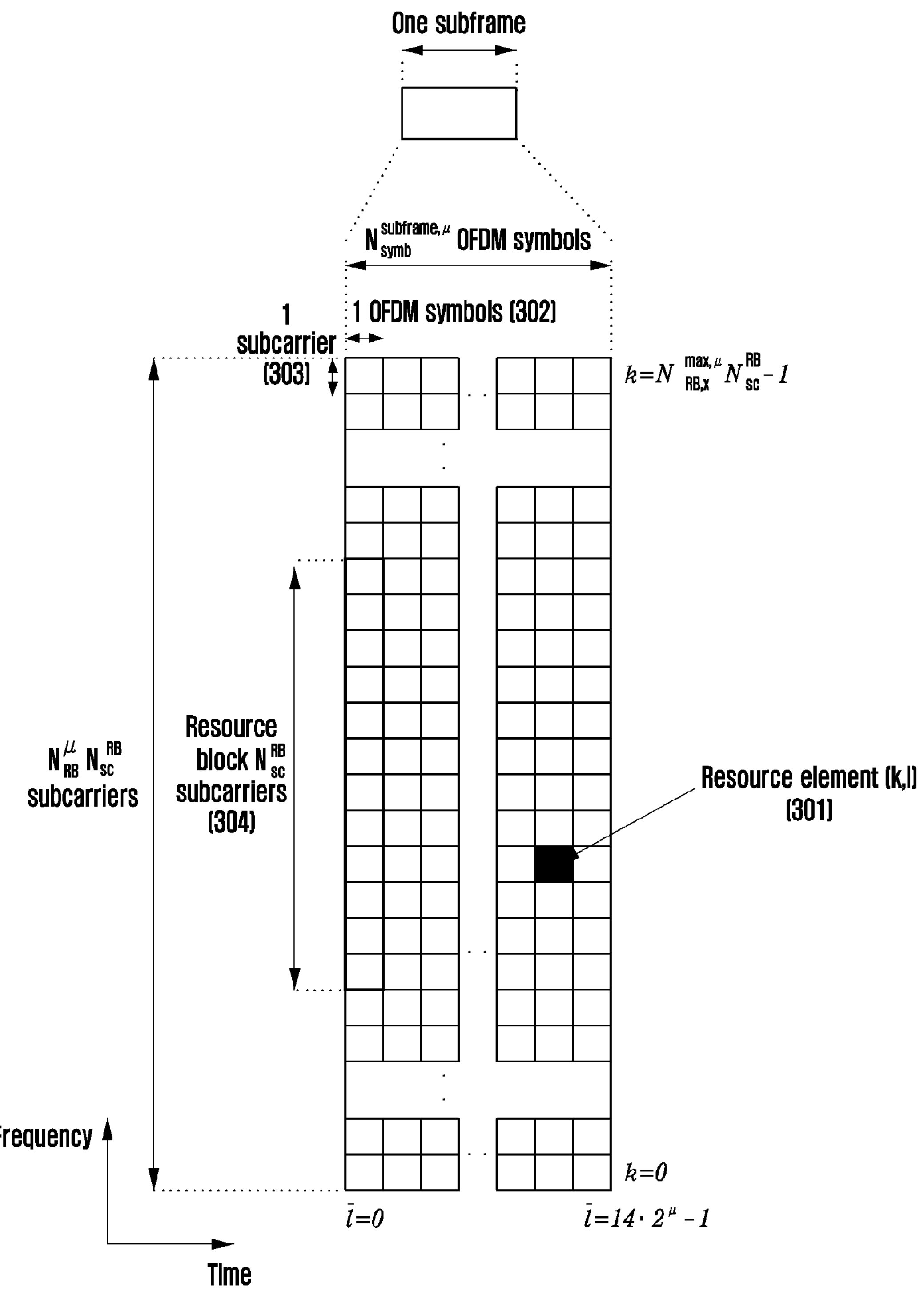
FIG. 3 is a diagram illustrating a basic structure of a time-frequency domain, which is a radio resource domain in which data or control channels are transmitted in a 5G communication system according to various embodiments.

FIG. 3 is a diagram illustrating an example of a basic structure of a time-frequency domain, which is a radio resource domain in which data or control channels are transmitted in a 5G system according to various embodiments.

A horizontal axis of FIG. 3 represents a time domain, and a vertical axis of FIG. 3 represents a frequency domain. A basic unit of resources in the time and frequency domains is a resource element (RE) 301 and may be defined to 1 orthogonal frequency division multiplexing (OFDM) symbol 302 on the time axis and 1 subcarrier 303 on the frequency axis. In the frequency domain, the $$N_{SC}^{RB}$$

(e.g., 12) number of consecutive REs may include one resource block (RB) 304.

Figure 4:
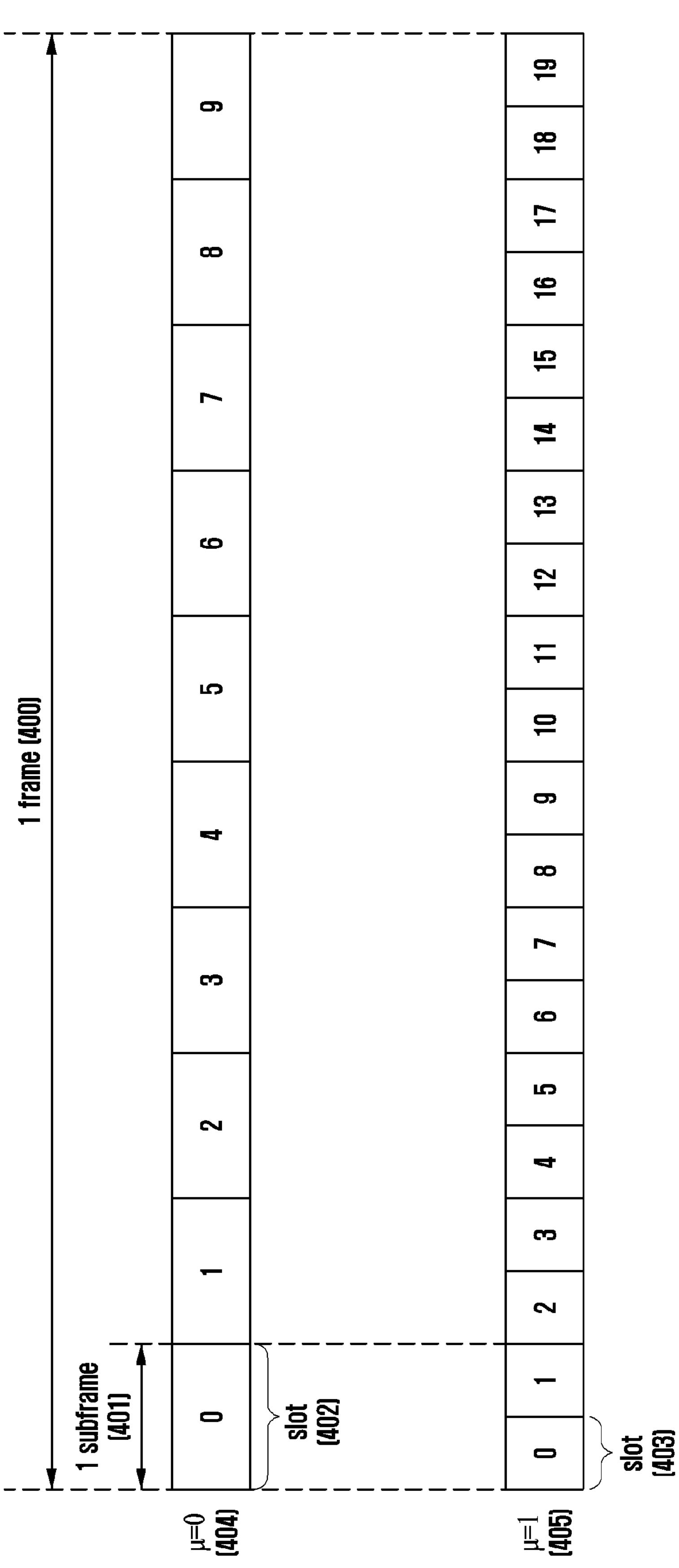
FIG. 4 is a diagram illustrating an example of a slot structure considered in a 5G system according to various embodiments.

FIG. 4 is a diagram illustrating an example of a slot structure considered in a 5G system according to various embodiments.

FIG. 4 illustrates an example of a structure of a frame 400, a subframe 401, and a slot 402. 1 frame 400 may be defined to 10 ms. 1 subframe 401 may be defined to 1 ms; thus, 1 frame 400 may be total 10 subframes 401. 1 slots 402 and 403 may be defined to 14 OFDM symbols (e.g., the number $$N_{symb}^{slot}$$

of symbols per slot is 14). 1 subframe 401 may be one or a plurality of slots 402 and 403, and the number of slots 402 and 403 per subframe 401 may vary according to configuration values μ 404 and 405 for subcarrier spacing. In an example of FIG. 4, the case that μ=0, 404 and the case that μ=1, 405 are illustrated as the subcarrier spacing configuration value. In the case that μ=0, 404, 1 subframe 401 may be 1 slot 402, and in the case that μ=1, 405, 1 subframe 401 may be 2 slots 403. That is, the number $$N_{slot}^{subframe,\mu}$$

of slots per subframe may vary according to the configuration value p for the subcarrier spacing; thus, the number $$N_{slot}^{frame,\mu}$$

of slots per frame may vary.

$$N_{slot}^{subframe,\mu}$$

and $$N_{slot}^{frame,\mu}$$

according to each subcarrier spacing configuration p may be defined in Table 1.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Hereinafter, a bandwidth part (BWP) configuration in the 5G communication system will be described in greater detail below with reference to FIG. 5.

Figure 5:
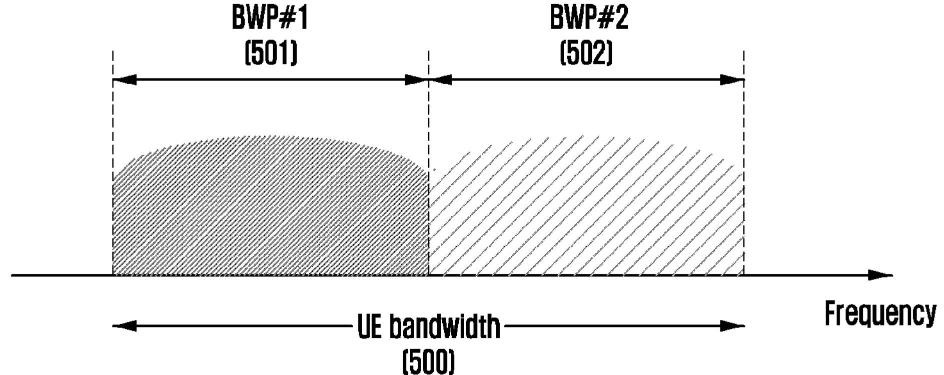
FIG. 5 is a diagram illustrating an example configuration for a bandwidth part in a 5G communication system according to various embodiments.

FIG. 5 is a diagram illustrating an example configuration for a bandwidth part in a 5G communication system according to various embodiments.

FIG. 5 illustrates an example in which a UE bandwidth 500 is configured to two bandwidth parts (BWPs), that is, a BWP #1, 501 and a BWP #2, 502. The base station may configure one or a plurality of bandwidth parts to the UE and configure information such as Table 2 for each bandwidth part. The following BWP may be referred to as BWP configuration information.

TABLE 2

| | |
|---|---|
| BWP ::= | SEQUENCE { |
| bwp-Id | BWP-Id, |
| (Bandwidth Part Identifier) | |
| locationAndBandwidth | INTEGER (1..65536), |
| (Bandwidth part location) | |
| subcarrierSpacing | ENUMERATED {no, n1, n2, n3, n4, n5}, |
| (subcarrier spacing) | |
| cyclicPrefix | ENUMERATED { extended } |
| (cyclic prefix) | |
| } | |

The disclosure is not limited to the above example, and various parameters related to the bandwidth part may be configured to the UE in addition to the configuration information. The information may be transmitted from the base station to the UE through higher layer signaling, for example, RRC signaling. At least one bandwidth part among configured one or a plurality of bandwidth parts may be activated. Whether the configured bandwidth part is activated may be semi-statically transmitted from the base station to the UE through RRC signaling or may be dynamically transmitted from the base station to the UE through downlink control information (DCI).

According to various embodiments, the UE before RRC connection may receive a configuration of an initial BWP for initial access from the base station through a master information block (MIB). For example, in an initial access step, the UE may receive configuration information on a search space and a control resource set (CORESET) in which a PDCCH for receiving system information (may correspond to remaining system information (RMSI) or system information block 1 (SIB1)) necessary for initial access may be transmitted through the MIB. The CORESET and search space configured by the MIB may be regarded as an identity (ID) 0, respectively. The base station may notify the UE of configuration information such as frequency allocation information, time allocation information, and numerology for the control resource set #0 through the MIB. Further, the base station may notify the UE of configuration information on a monitoring period and occasion for the control resource set #0, that is, configuration information on a search space #0 through the MIB. The UE may regard a frequency domain configured to the control resource set #0 acquired from the MIB as an initial bandwidth part for initial access. In this case, an identifier (ID) of the initial bandwidth part may be regarded as 0.

The configuration for the bandwidth part supported by 5G may be used for various purposes.

According to various embodiments, in the case that a bandwidth supported by the UE is smaller than the system bandwidth, this may be supported through the bandwidth part configuration. For example, when the base station configures a frequency position (configuration information 2) of the bandwidth part to the UE, the UE may transmit and receive data at a specific frequency position within the system bandwidth.

Further, according to various embodiments, for the purpose of supporting different numerologies, the base station may configure a plurality of bandwidth parts to the UE. For example, in order to support both data transmission and reception using subcarrier spacing of 15 kHz and subcarrier spacing of 30 kHz to a certain UE, the base station may configure two bandwidth parts to subcarrier spacings of 15 kHz and 30 kHz, respectively. Different bandwidth parts may be frequency division multiplexed, and in the case that data is to be transmitted and received at specific subcarrier spacing, a bandwidth part configured at corresponding subcarrier spacing may be activated.

Further, according to various embodiments, for the purpose of reducing power consumption of the UE, the base station may configure bandwidth parts having different sizes of bandwidth to the UE. For example, in the case that the UE supports a very large bandwidth, for example, a bandwidth of 100 MHz and always transmits and receives data with the corresponding bandwidth, very large power consumption may occur. In particular, monitoring an unnecessary downlink control channel with a large bandwidth of 100 MHz in a situation where there is no traffic may be very inefficient in terms of power consumption. For the purpose of reducing power consumption of the UE, the base station may configure a bandwidth part of a relatively small bandwidth, for example, a bandwidth part of 20 MHz to the UE. In a situation where there is no traffic, the UE may perform a monitoring operation in the bandwidth part of 20 MHz, and in the case that data is generated, the UE may transmit and receive data with the bandwidth part of 100 MHz according to the instruction of the base station.

In a method of configuring the bandwidth part, UEs before RRC connection may receive configuration information on the initial bandwidth part through an MIB in an initial access step. For example, the UE may receive a configuration of a CORESET for a downlink control channel through which DCI for scheduling the SIB may be transmitted from the MIB of a physical broadcast channel (PBCH). A bandwidth of the CORESET configured by the MIB may be regarded as an initial bandwidth part, and the UE may receive a PDSCH through which the SIB is transmitted through the configured initial bandwidth part. The initial bandwidth part may be used for other system information (OSI), paging, and random access in addition to the use of receiving the SIB.

Figure 6:
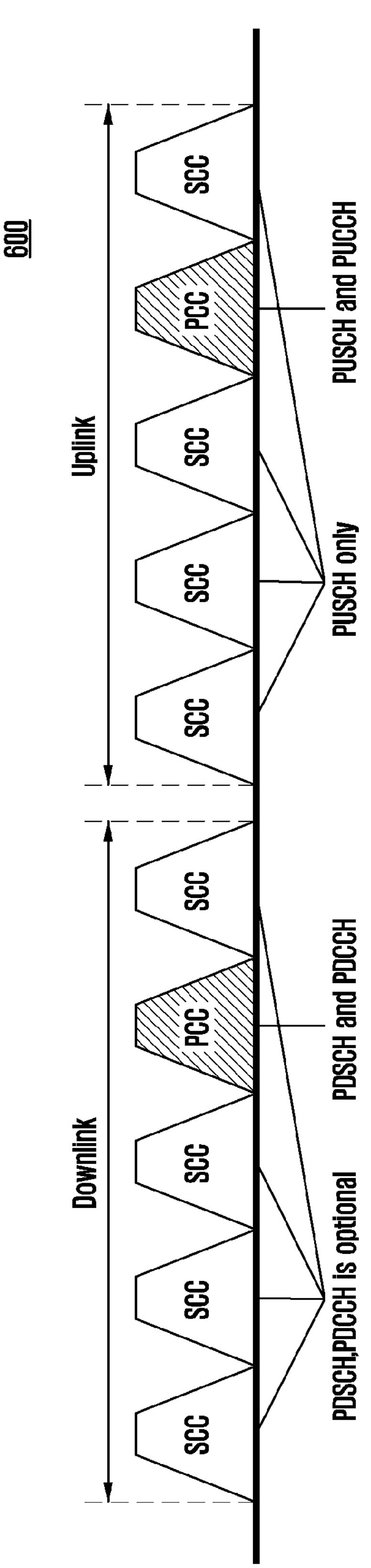
FIG. 6 is a diagram illustrating example carrier aggregation (CA) according to various embodiments.

FIG. 6 is a diagram illustrating example carrier aggregation (CA) according to various embodiments.

With reference to FIG. 6, in the case that CA is configured (600), a primary cell (PCell) and a secondary cell (SCell) may be configured to the UE.

The PCell is included in a primary component carrier (PCC) and may provide RRC connection establishment/re-establishment, measurement, mobility procedure, random access procedure and selection, system information acquisition, initial random access, security key change, and non-access stratum (NAS) function.

Because the UE monitors system information through the PCell, the PCell is not deactivated, and in the UL, the PCC is carried through a physical uplink control channel (PUCCH) for control information transmission. Further, only one RRC may be connected between the UE and the PCell, and PDCCH/PDSCH/PUSCH (physical uplink shared channel)/PUCCH transmission is possible. Further, in a secondary cell group, a spcell of the secondary cell group (PSCell) may be configured to the PCell and operated. Operations of the PCell described below may be performed by the PSCell.

A total of 31 SCells may be added, and in the case that it is required to provide additional radio resources, the SCell may be configured through an RRC message (e.g., dedicated signaling). The RRC message may include a physical cell ID for each cell and include a DL carrier frequency (absolute radio frequency channel number (ARFCN)). PDCCH/PDSCH/PUSCH transmission is possible through the SCell. In order to conserve a battery of the UE through the MAC layer, dynamic activation and deactivation procedures of the SCell are supported.

Cross-carrier scheduling may refer, for example, to allocating at least one (e.g., PDCCH) of all L1 control channels or L2 control channels for at least one other component carrier (CC) to one CC. A carrier indicator field (CIF) may be used for transmitting data information of another CC through a PDCCH of one CC.

Resources (PDSCH, PUSCH) for data transmission of the CC or resources (PDSCH, PUSCH) for data transmission of another CC may be allocated through control information transmitted through a PDCCH of one CC.

With the application of cross-carrier scheduling, an n-bit CIF is added to the DCI format, the bit size may vary according to an upper layer configuration or DCI format, and a position of the CIF in the DCI format may be fixed.

Figure 7:
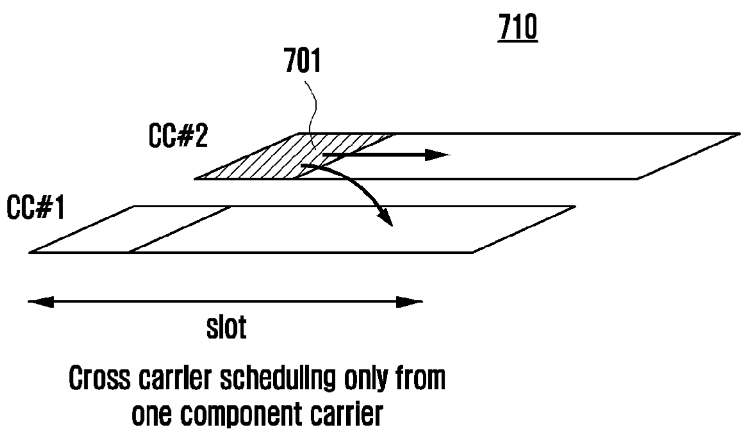
FIG. 7 is a diagram illustrating an example of a cross-carrier scheduling method according to various embodiments.
Figure 7:
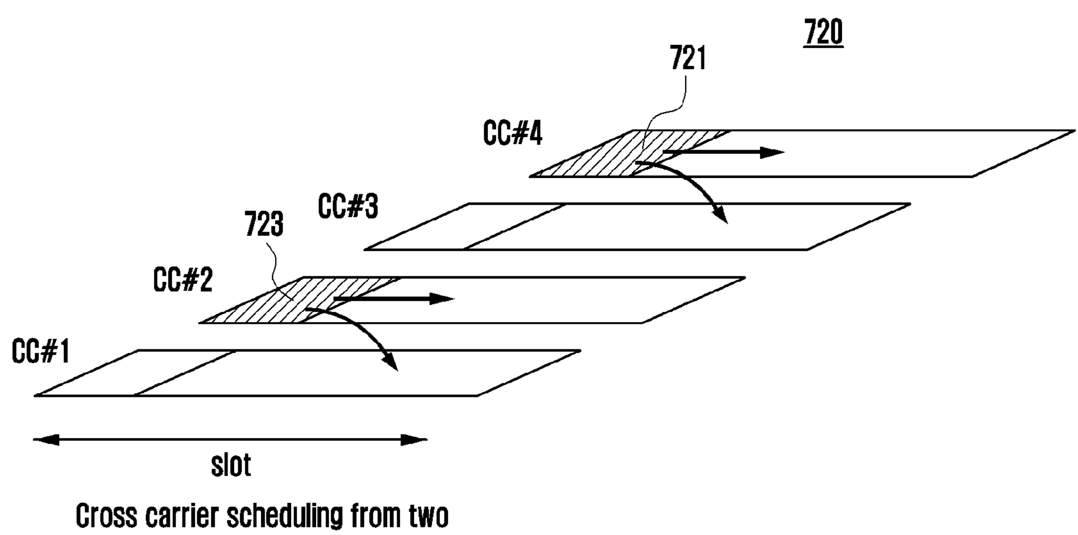

FIG. 7 is a diagram illustrating an example of a cross-carrier scheduling method according to various embodiments.

With reference to 710 of FIG. 7, a PDSCH or PUSCH for two CCs may be scheduled through a PDCCH 701 of one CC.

Further, with reference to 720 of FIG. 7, in the case that total four CCs are configured, the PDSCH or PUSCH of each CC may be scheduled using PDCCHs 721 and 723 of two CCs.

Each CC may be mapped to a carrier indicator (CI) value for CIF application, which may be transmitted from the base station to the UE through a dedicated RRC signal with a UE specific configuration.

Each PDSCH/PUSCH CC may be scheduled from one DL CC. Therefore, the UE needs to monitor the PDCCH only in the DL CC for each PDSCH/PUSCH CC. The UE may monitor the PDCCH in the DL CC to acquire PUSCH scheduling information in a linked UL carrier. The UE may monitor the PDCCH in the DL CC to acquire PDSCH scheduling information in a linked DL carrier.

Figure 8:
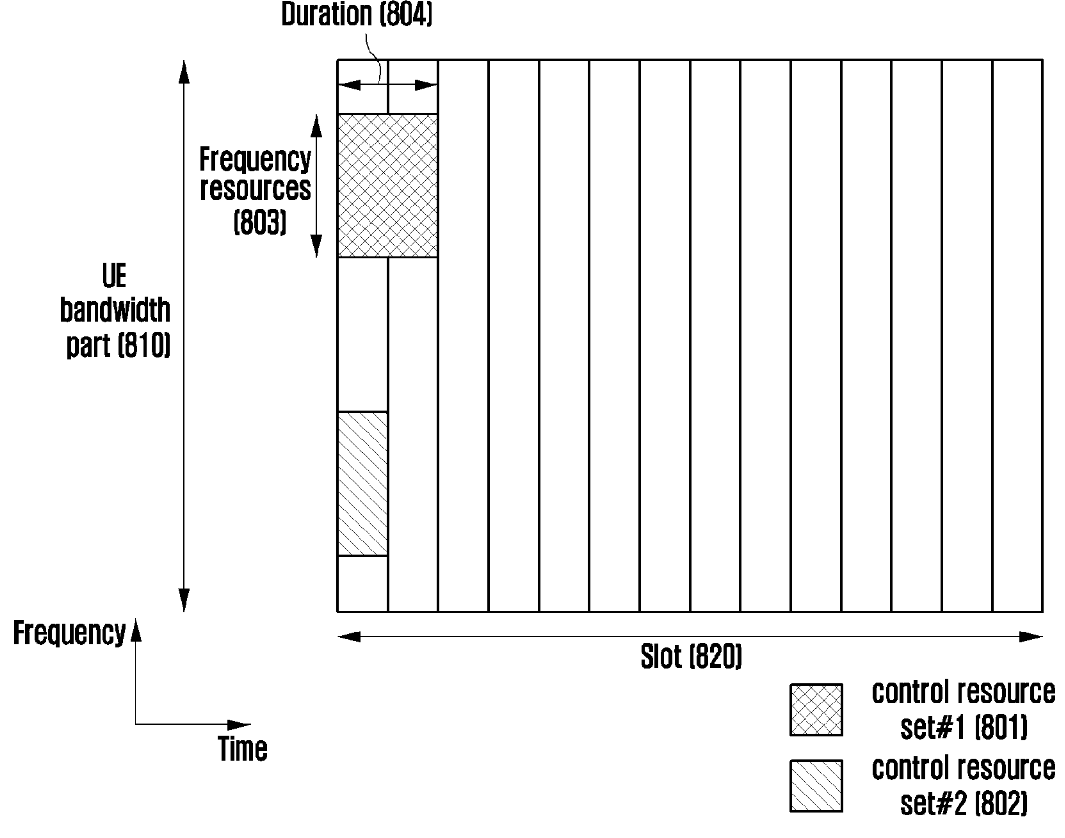
FIG. 8 is a diagram illustrating an example of a control resource set (CORESET) configuration of a downlink control channel in a wireless communication system according to various embodiments.

FIG. 8 is a diagram illustrating an example of a CORESET configuration of a downlink control channel in a wireless communication system according to various embodiments.

With reference to FIG. 8, FIG. 8 illustrates an example in which a UE bandwidth part 810 on the frequency axis and two CORESETs (CORESET #1, 801, CORESET #2, 802) within one slot 820 on the time axis are configured. The CORESETs 801 and 802 may be configured to a specific frequency resource 803 within the entire UE bandwidth part 810 on the frequency axis. The CORESETs 801 and 802 may be configured to one or a plurality of OFDM symbols on the time axis, which may be defined to a control resource set duration 804. In the example of FIG. 8, the CORESET #1, 801 is configured to a control resource set duration of two symbols, and the CORESET #2, 802 is configured to a control resource set duration of one symbol.

The CORESET in 5G described above may be configured by the base station to the UE through higher layer signaling (e.g., system information, MIB, RRC signaling). Configuring the CORESET to the UE may refer, for example, to providing information such as a CORESET identity, a frequency location of the CORESET, and a symbol length of the CORESET to the UE. For example, the information may include information of Table 3.

TABLE 3

```
ControlResourceSet ::=                     SEQUENCE {
  -- Corresponds to L1 parameter 'CORESET-ID'
  controlResourceSetId                     ControlResourceSetId,
 (Control resource set identifier)
   frequencyDomainResources              BIT STRING (SIZE
(45)),
 (Frequency axis resource allocation information)
    duration                               INTEGER
(1..maxCoReSetDuration),
 (Time axis resource allocation information)
  cce-REG-MappingType                      CHOICE {
 (CCE-to-REG mapping scheme)
    interleaved
 SEQUENCE {
      reg-BundleSize
 ENUMERATED {n2, n3, n6},
  (REG bundle size)
      precoderGranularity
 ENUMERATED (sameASREG-bundle, allContiguousRBs),
      interleaverSize
 ENUMERATED {n2, n3, n6}
       (interleaver size)
      shiftIndex
INTEGER(0..maxNrofPhysicalResourceBlocks-1)
      OPTIONAL
   (Interleaver shift)
 },
  nonInterleaved                           NULL
  },
  tci-StatesPDCCH
SEQUENCE(SIZE (1..maxNrofTCI-StatesPDCCH)) OF TCI-StateId
    OPTIONAL,
(QCL configuration information)
  tci-PresentInDCI                         ENUMERATED
{enabled}
  OPTIONAL, Need S
}
```

The number of CCEs required to transmit the PDCCH may be 1, 2, 4, 8, or 16 according to an aggregation level (AL), and the numbers of different CCEs may be used for implementing link adaptation of the downlink control channel. For example, in the case that AL=L, one downlink control channel may be transmitted through the L number of CCEs. The UE should detect (blind decoding) a signal without knowing information on a downlink control channel, and a search space representing a set of CCEs is defined for blind decoding. The search space is a set of downlink control channel candidates including CCEs in which the UE should attempt to decode on a given aggregation level, and because there are various aggregations levels that make one group with 1, 2, 4, 8, and 16 CCEs, the UE may have a plurality of search spaces. A search space set may be defined as a set of search spaces in all configured aggregation levels.

The search space may be classified into a common search space and a UE-specific search space. In order to receive cell common control information such as dynamic scheduling for system information or paging messages, a certain group of UEs or all UEs may search for the common search space of the PDCCH. For example, PDSCH scheduling allocation information for transmission of an SIB including cell operator information may be received by searching for the common search space of the PDCCH. In the case of a common search space, because a certain group of UEs or all UEs should receive the PDCCH, the common search space may be defined as a set of pre-promised CCEs. Scheduling assignment information on the UE-specific PDSCH or PUSCH may be received by searching for the UE-specific search space of the PDCCH. The UE-specific search space may be defined UE-specifically as a function of various system parameters and the identity of the UE.

In 5G, a parameter for a search space for a PDCCH may be configured from the base station to the UE through higher layer signaling (e.g., SIB, MIB, RRC signaling). For example, the base station may configure the number of PDCCH candidates at each aggregation level L, a monitoring period for the search space, a monitoring occasion in symbol units within a slot for the search space, a search space type (common search space or UE-specific search space), a combination of a DCI format and a radio network temporary identifier (RNTI) to be monitored in a corresponding search space, and a CORESET index to monitor a search space to the UE. For example, the parameter for the search space for the PDCCH may include at least some of the information of Table 4.

TABLE 4

```
SearchSpace ::=                                    SEQUENCE {
  -- Identity of the search space. SearchSpaceId searchSpaceId = 0 identifies the
 SearchSpace configured via PBCH (MIB) or ServingCellConfigCommon.
    SearchSpaceId,                                    SearchSpaceId,
  (search space identifier)
    ControlResourceSetId,                             Control ResourceSetId
  (control resource set identifier)
    monitoringSlotPeriodicity AndOffset            CHOICE {
  (monitoring slot level period)
      s11
  NULL,
      s12
  INTEGER (0..1),
      s14
  INTEGER (0..3),
      s15                                              INTEGER
(0..4),
      s18
  INTEGER (0..7),
      s110                                             INTEGER
(0..9),
      s116                                             INTEGER
(0..15),
      s120                                             INTEGER
(0..19)
    }
          OPTIONAL,
   duration(monitoring length)     INTEGER (2..2559)
     monitoring SymbolsWithinSlot                     BIT STRING
(SIZE (14))
   OPTIONAL,
    (monitoring symbols in slots)
      nrofCandidates                                 SEQUENCE {
(Number of PDCCH candidates by aggregation level)
        aggregationLevel1                            ENUMERATED
{n0, n1, n2, n3, n4, n5, n6, n8},
        aggregationLevel2                            ENUMERATED
{no, n1, n2, n3, n4, n5, n6, n8},
        aggregationLevel4                            ENUMERATED
{no, n1, n2, n3, n4, n5, n6, n8},
        aggregationLevel8                            ENUMERATED
{no, n1, n2, n3, n4, n5, n6, n8},
        aggregationLevel16
    ENUMERATED {no, n1, n2, n3, n4, n5, n6, n8}
         },
       searchSpaceType                                  CHOICE {
       (search space type)
          -- Configures this search space as common search space (CSS)
and DCI formats to monitor.
          common
   SEQUENCE {
     (common search space)
   }
    ue-Specific
  SEQUENCE {
    (UE-specific search space)
        -- Indicates whether the UE monitors in this USS for DCI
formats 0-0 and 1-0 or for formats 0-1 and 1-1.
        formats
    ENUMERATED (formats0-0-And-1-0, formats0-1-And-1-1},
          ...
       }
```

The base station may configure one or multiple search space sets to the UE. According to various embodiments, the base station may configure a search space set 1 and a search space set 2 to the UE. The UE may configure to monitor a DCI format A scrambled with an X-RNTI in the common search space in the search space set 1, and configure to monitor a DCI format B scrambled with a Y-RNTI in the UE-specific search space in the search space set 2.

According to the configuration information, one or a plurality of search space sets may exist in a common search space or a UE-specific search space. For example, a search space set #1 and a search space set #2 may be configured to common search spaces, and a search space set #3 and a search space set #4 may be configured to UE-specific search spaces.

In the common search space, a combination of the following DCI format and RNTI may be monitored. The disclosure is not limited to the following examples.

DCI format 0_0/1_0 with CRC (cyclic redundancy check) scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, a combination of the following DCI format and RNTI may be monitored. The disclosure is not limited to the following examples.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The specified RNTIs may follow the following definitions and uses.

C-RNTI (Cell RNTI): Used for scheduling a UE-specific PDSCH

TC-RNTI (Temporary Cell RNTI): Used for scheduling a UE-specific PDSCH

CS-RNTI (Configured Scheduling RNTI): Used for scheduling a semi-statically configured UE-specific PDSCH RA-RNTI (Random Access RNTI): Used for scheduling a PDSCH in a random access step P-RNTI (Paging RNTI): Used for scheduling a PDSCH through which paging is transmitted SI-RNTI (System Information RNTI): Used for scheduling a PDSCH through which system information is transmitted INT-RNTI (Interruption RNTI): Used for notifying whether puncturing for a PDSCH is performed TPC-PUSCH-RNTI (Transmit Power Control for PUSCH RNTI): Used for indicating a power control command for a PUSCH TPC-PUCCH-RNTI (Transmit Power Control for PUCCH RNTI): Used for indicating a power control command for a PUCCH TPC-SRS-RNTI (Transmit Power Control for SRS RNTI): Used for indicating a power control command for an SRS In 5G, the search space of the aggregation level L in the control resource set p and the search space set s may be represented as Equation 1.

$$L\cdot\left\{\left(Y_{p,n^{\mu}_{s,f}}+\left\lfloor\frac{m_{s,n_{CI}}\cdot N_{CCE,p}}{L\cdot M^{(L)}_{p,s,max}}\right\rfloor+n_{CI}\right)\bmod\lfloor N_{CCE,p}/L\rfloor\right\}+i \quad \text{[Equation 1]}$$

L: aggregation level nci: Carrier index

NCCE,p: The number of total CCEs present in the control resource set p $-n^{\mu}_{s,f}$:

slot index $M^{(L)}$p.s, max: The number of PDCCH candidates of aggregation level L $m_{s,n}$CI=0, . . . , $M^{(L)}$p.s, max−1: index of PDCCH candidates of aggregation level L i=0, . . . , L−1

$$-Y_{p,n^{\mu}_{s,f}}=\left(A_p\cdot Y_{p,n^{\mu}_{s,f}-1}\right)\bmod D,\ Y_{p,-1}=n_{RNTI}\neq 0,$$
$$A_0=39827,\ A_1=39829,\ A_2=39839,\ D=65537$$

nRNTI: UE identifier

The $$Y_{p,n^{\mu}_{s,f}}$$

value may correspond to 0 in the case of a common search space.

In the case of a UE-specific search space, the $$Y_{p,n^{\mu}_{s,f}}$$

value may correspond to a value that changes according to an identity of the UE (C-RNTI or an ID configured to the UE by the base station) and a time index.

Accordingly, the UE may monitor the PDCCH in the CORESET configured by the base station and transmit and receive data based on the received control information.

In the 5G system, scheduling information on uplink data (or physical uplink shared channel (PUSCH)) or downlink data (or physical downlink shared channel (PDSCH)) may be transmitted from the base station to the UE through DCI. The UE may monitor a DCI format for fallback and a DCI format for non-fallback with respect to the PUSCH or the PDSCH. The DCI format for fallback may be a predefined fixed field between the base station and the UE, and the DCI format for non-fallback may include a configurable field.

DCI may be transmitted through a PDCCH, which is a physical downlink control channel, through channel coding and modulation processes. A CRC is added to the DCI message payload and may be scrambled based on the RNTI corresponding to the identity of the UE. Different RNTIs may be used according to the purpose of the DCI message, e.g., UE-specific data transmission, power control command, or random access response. That is, the RNTI is not transmitted explicitly but is included and transmitted in a CRC calculation process. Upon receiving the DCI message transmitted on the PDCCH, the UE may identify the CRC using the allocated RNTI, and if the CRC identification result is correct, the UE may know that the corresponding message has been transmitted to the UE.

For example, DCI scheduling a PDSCH for system information (SI) may be scrambled with an SI-RNTI. DCI scheduling a PDSCH for a random access response (RAR) message may be scrambled with an RA-RNTI. DCI scheduling a PDSCH for a paging message may be scrambled with a P-RNTI. DCI notifying a slot format indicator (SFI) may be scrambled with an SFI-RNTI. DCI notifying transmit power control (TPC) may be scrambled with a TPC-RNTI. DCI scheduling a UE-specific PDSCH or PUSCH may be scrambled with a cell RNTI (C-RNTI).

In NR, for efficient control information reception of the UE, various types of DCI formats may be provided, as illustrated in Table 5.

TABLE 5

| DCI format | Usage |
|---|---|
| 0_0 | Scheduling of PUSCH in one cell |
| 0_1 | Scheduling of PUSCH in one cell |
| 0_2 | Scheduling of PUSCH in one cell |
| 1_0 | Scheduling of PDSCH in one cell |
| 1_1 | Scheduling of PDSCH in one cell |
| 1_2 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

For example, in order to schedule a PDSCH for one cell to the UE, the base station may use a DCI format 1_0, a DCI format 1_1, or a DCI format 1_2. For another example, in order to schedule a PUSCH for one cell to the UE, the base station may use a DCI format 0_0, a DCI format 0_1, or a DCI format 0_2. In the case that the DCI format 1_0 is transmitted together with a CRC scrambled by a C-RNTI, CS-RNTI, MCS-C-RNTI, or new-RNTI, the DCI format 1_0 may include, for example, information of at least Table 6:

TABLE 6

Identifier for DCI formats (1 bits): A DCI format indicator is always configured to 1
Frequency domain resource assignment (NRBG bits or $\lceil \log_2(N_{RB}^{DL,BWP}(N_{RB}^{DL,BWP}+1)/2) \rceil$ bits:

Indicates frequency axis resource assignment, and in the case that a DCI format 1_0 is monitored in the UE specific search space, $N_{RB}^{DL,BWP}$ is the size of the active DL BWP, otherwise $N_{RB}^{DL,BWP}$ is the size of the initial DL BWP. NRBG is the number of resource block groups. A detailed method thereof refers to the above frequency axis resource assignment.
time domain resource assignment (0 to 4 bits): Indicates time axis resource assignment of a PDSCH.
VRB-to-PRB mapping (1 bit): 0 indicates non-interleaved, and 1 indicates interleaved VRP-to-PRB mapping.
Modulation and coding scheme (5 bits): Indicates the modulation order and coding rate used for PDSCH transmission.
New data indicator (1 bit): Indicates whether the PDSCH is initial transmission or retransmission according to whether it is toggled.
Redundancy version (2 bits): Indicates the redundancy version used for PDSCH transmission.
HARQ process number (4 bits): Indicates the HARQ process number used for PDSCH transmission.

TABLE 6-continued

Downlink assignment index (2 bits): DAI indicator
TPC command for scheduled PUCCH (2 bits): PUCCH power control indicator
PUCCH resource indicator (3 bits): As a PUCCH resource indicator, it indicates one of 8 resources configured to the upper layer.
PDSCH-to-HARQ_feedback timing indicator (3 bits): As a HARQ feedback timing indicator, it indicates one of 8 feedback timing offsets configured to the upper layer.

In the case that the DCI format 1_1 is transmitted together with a CRC scrambled by a cell radio network temporary identifier (C-RNTI), a configured scheduling RNTI (CS-RNTI), a mcs-C-RNTI, or a new-RNTI, the DCI format 1_1 may include information such as at least Table 7.

TABLE 7

Identifier for DCI formats (1 bit): A DCI format indicator is always configured to 1
Carrier indicator (0 or 3 bits): Indicates a CC (or cell) to which a PDSCH allocated by the corresponding DCI is transmitted.
Bandwidth part indicator (0, 1, or 2 bits): Indicates a BWP to which a PDSCH allocated by the corresponding DCI is transmitted.
Frequency domain resource assignment (determine a payload according to the frequency axis resource assignment): Indicates frequency axis resource assignment, and $N_{RB}^{DL,BWP}$ is the size of the active DL BWP. A detailed method thereof refers to the above frequency axis resource assignment.
Time domain resource assignment (0 to 4 bits): Indicates time axis resource assignment according to the above description.
VRB-to-PRB mapping (0 or 1 bit): 0 indicates non-interleaved, and 1 indicates interleaved VRP-to-PRB mapping. 0 bit in the case that frequency axis resource allocation is configured to a resource allocation type 0 or in the case that interleaved VRB-to-PRB mapping is not configured by a higher layer.
PRB bundling size indicator (0 or 1 bit): 0 bit in the case that an upper layer parameter prb-BundlingType is not configured or is configured to 'static', and 1 bit in the case that the upper layer parameter prb-BundlingType is configured to 'dynamic'.
Rate matching indicator (0, 1, or 2 bits): Indicates a rate matching pattern.
ZP CSI-RS trigger (0, 1, or 2 bits): An indicator that triggers an aperiodic ZP CSI-RS.
For transport block 1:
Modulation and coding scheme (5 bits): Indicates the modulation order and coding rate used for PDSCH transmission.
New data indicator (1 bit): Indicates whether the PDSCH is initial transmission or retransmission according to whether it is toggled.
Redundancy version (2 bits): Indicates the redundancy version used for PDSCH transmission.
For transport block 2:
Modulation and coding scheme (5 bits): Indicates the modulation order and coding rate used for PDSCH transmission.
New data indicator (1 bit): Indicates whether the PDSCH is initial transmission or retransmission according to whether it is toggled.
Redundancy version (2 bits): Indicates the redundancy version used for PDSCH transmission.
HARQ process number (4 bits): Indicates the HARQ process number used for PDSCH transmission.
Downlink assignment index (0, 2, or 4 bits): DAI indicator
TPC command for scheduled PUCCH (2 bits): PUCCH power control indicator
PUCCH resource indicator (3 bits): As a PUCCH resource indicator, it indicates one of 8 resources configured as the higher layer.
PDSCH-to-HARQ_feedback timing indicator (3 bits): As a HARQ feedback timing indicator, it indicates one of 8 feedback timing offsets configured to the upper layer.
Antenna port (4 or 5 or 6 bits): Indicates a DMRS port and a CDM group without data.
Transmission configuration indication (0 or 3 bits): TCI indicator.
SRS request (2 or 3 bits): SRS transmission request indicator
CBG transmission information (0 or 2 or 4 or 6 or 8 bits): An indicator indicating whether code block groups in the allocated PDSCH are transmitted. 0 means that the corresponding CBG is not transmitted, and 1 means that the corresponding CBG is transmitted.

TABLE 7-continued

| |
|---|
| CBG flushing out information (0 or 1 bit): An indicator indicating whether previous CBGs are contaminated. 0 means that previous CBGs may be contaminated, and 1 means that previous CBGs may be used when retransmitted CBGs are received (combinable). |
| DMRS sequence initialization (0 or 1 bit): DMRS scrambling ID selection indicator |

In the case that a DCI format 1_2 is transmitted together with a CRC scrambled by a cell radio network temporary identifier (C-RNTI), a configured scheduling RNTI (CS-RNTI), a mcs-C-RNTI, or a new-RNTI, the DCI format 1_2 may include information such as at least Table 8.

TABLE 8

| |
|---|
| Identifier for DCI formats (1 bit): A DCI format indicator is always configured to 1 |
| Carrier indicator (0, 1, 2, or 3 bits): Indicates a CC (or cell) to which the PDSCH allocated by the corresponding DCI is transmitted. |
| Bandwidth part indicator (0, 1, or 2 bits): Indicates a BWP to which the PDSCH allocated by the corresponding DCI is transmitted. |
| Frequency domain resource assignment (determine a payload according to the frequency axis resource assignment): Indicates frequency axis resource assingment, and $N_{RB}^{DL,BWP}$ is the size of the active DL BWP. A detailed method thereof refers to the above frequency axis resource assignment. |
| Time domain resource assignment (0 to 4 bits): Indicates time axis resource assignment according to the above description. |
| VRB-to-PRB mapping (0 or 1 bit): 0 indicates non-interleaved, and 1 indicates interleaved VRP-to-PRB mapping. 0 bit in the case that a vrb-ToPRB-InterleaverForDCI-Format1-2 configuration parameter of the upper layer is not configured. |
| PRB bundling size indicator (0 or 1 bit): 0 bit in the case that an upper layer parameter prb-BundlingTypeForDCI-Format1-2 is not configured or is configured to 'static', and 1 bit in the case that an upper layer parameter prb-BundlingTypeForDCI-Format1-2 is configured to 'dynamic'. |
| Rate matching indicator (0, 1, or 2 bits): Indicates a rate matching pattern. |
| ZP CSI-RS trigger (0, 1, or 2 bits): An indicator that triggers an aperiodic ZP CSI-RS. |
| Modulation and coding scheme (5 bits): Indicates a modulation order and coding rate used for PDSCH transmission. |
| New data indicator (1 bit): Indicates whether the PDSCH is initial transmission or retransmission according to whether it is toggled. |
| Redundancy version (0, 1, or 2 bits): Indicates the redundancy version used for PDSCH transmission. |
| HARQ process number (0, 1, 2, 3, or 4 bits): Indicates the HARQ process number used for PDSCH transmission. |
| Downlink assignment index (0, 1, 2, or 4 bits): DAI indicator |
| TPC command for scheduled PUCCH (2 bits): PUCCH power control indicator |
| PUCCH resource indicator (0, 1, 2, or 3 bits): It is a PUCCH resource indicator and indicates one of resources configured to the upper layer. |
| PDSCH-to-HARQ_feedback timing indicator (0, 1, 2, or 3 bits): As a HARQ feedback timing indicator, it indicates one of feedback timing offsets configured to the upper layer. |
| Antenna port (4 or 5 or 6 bits): Indicates DMRS port and CDM group without data. |
| Transmission configuration indication (0, 1, 2, or 3 bits): TCI indicator. |
| SRS request (0, 1, 2, or 3 bits): SRS transmission request indicator |
| DMRS sequence initialization (0 or 1 bit): DMRS scrambling ID selection indicator |
| Priority indicator (0 or 1 bit): 0 bit if an upper layer priorityIndicatorForDCI-Format1-2 parameter is not configured, and 1 bit if an upper layer priorityIndicatorForDCI-Format1-2 parameter is configured |

The maximum number of DCIs of different sizes that may be received by the UE per slot in the corresponding cell is 4. The maximum number of DCIs of different sizes scrambled with a C-RNTI that may be received by the UE per slot in the corresponding cell is 3. The base station may configure time domain resource assignment information (e.g., information constituted in the form of a table) on the physical downlink shared channel (PDSCH) and the physical uplink shared channel (PUSCH) to the UE through higher layer signaling (e.g., RRC signaling). The base station may configure resource assignment information (e.g., including information in the form of a table) including the maxNrofDL-Allocations=16 number of entries for the PDSCH, and configure resource assignment information including the maxNrofUL-Allocations=16 number of entries for the PUSCH (e.g., information in the form of a table). The time domain resource assignment information may include, for example, PDCCH-to-PDSCH slot timing (corresponding to a time interval in units of slots between a time point of receiving the PDCCH and a time point of transmitting the PDSCH scheduled by the received PDCCH, denoted as KG), or PDCCH-to-PUSCH slot timing (corresponding to a time interval in units of slots between a time point at which the PDCCH is received and a time point at which the PUSCH scheduled by the received PDCCH is transmitted, denoted as K2), information on a position and length of a starting symbol in which the PDSCH or PUSCH is scheduled within the slot, a mapping type of the PDSCH or PUSCH, and the like. For example, information such as Table 9 or 10 may be notified from the base station to the UE.

TABLE 9

```
  PDSCH-TimeDomainResourceAllocationListinformation element
  PDSCH-TimeDomainResourceAllocationList      ::=      SEQUENCE
(SIZE(1..maxNrofDL-Allocations)) OF PDSCH-
TimeDomainResourceAllocation
  PDSCH-TimeDomainResourceAllocation ::=       SEQUENCE {
    ko                                            INTEGER(0..32)
OPTIONAL, - Need S
    (PDCCH-to-PDSCH timing, slot unit)
  mapping Type          ENUMERATED {typeA, typeB},
  (PDSCH mapping type)
  startSymbolAndLength          INTEGER (0..127)
  (start symbol and length of PUSCH)
  }
```

TABLE 10

```
  PUSCH-TimeDomainResourceAllocation information element
  PUSCH-TimeDomainResourceAllocationList = SEQUENCE
(SIZE(1..maxNrofUL-Allocations)) OF PUSCH-
TimeDomainResourceAllocation
  PUSCH-TimeDomainResourceAllocation ::= SEQUENCE {
    k2              INTEGER(0..32)          OPTIONAL, -- Need S
    (PDCCH-to-PUSCH timing, slot unit)
    mappingType         ENUMERATED {typeA, typeB},
    (PUSCH mapping type)
    startSymbolAndLength       INTEGER (0..127)
    (start symbol and length of PUSCH)
  }
```

The base station may notify the UE of one of table entries for the time domain resource assignment information through L1 signaling (e.g., DCI) (e.g., may be indicated by a time domain resource assignment field in DCI). The UE may acquire time domain resource assignment information on the PDSCH or PUSCH based on the DCI received from the base station.

Hereinafter, a method of allocating frequency domain resources for a data channel in a 5G communication system will be described in greater detail.

5G supports two types, a resource assignment type 0 and a resource assignment type 1 with a method of indicating frequency domain resource assignment information on a physical downlink shared channel (PDSCH) and a physical uplink shared channel (PUSCH).

In the resource assignment type 0, RB allocation information may be notified from the base station to the UE in the form of a bitmap for a resource block group (RBG). In this case, the RBG may include a set of consecutive VRBs, and a size P of the RBG may be determined based on a value configured with an upper layer parameter (rbg-Size) and a size value of the bandwidth part defined as illustrated in Table 11.

TABLE 11

| | Nominal RBG size P | |
|---|---|---|
| Bandwidth Part Size | Configuration 1 | Configuration 2 |
| 1-36 | 2 | 4 |
| 37-72 | 4 | 8 |
| 73-144 | 8 | 16 |
| 145-275 | 16 | 16 |

The number $N_{RBG}$ of total RBGs of a bandwidth part i having a size of $$M_{BWP,i}^{size},$$

may be defined as follows.

$$N_{RBG} = \left\lceil \left(N_{BWP,i}^{size} + \left(N_{BWP,i}^{start} \bmod P\right)\right) / P \right\rceil,$$

where the size of the first RBG is $$RBG_0^{size} = P - N_{BWP,i}^{start} \bmod P,$$

the size of last RBG is $$RBG_{last}^{size} = \left(N_{BWP,i}^{start} + N_{BWP,i}^{size}\right) \bmod P \text{ if } \left(N_{BWP,i}^{start} + N_{BWP,i}^{size}\right) \bmod P > 0$$

and P otherwise, the size of all other RBGs is P.

Each bit of the $N_{RBG}$ bit-sized bitmap may correspond to each RBG. RBGs may be indexed in order of an increasing frequency starting from a lowest frequency position of the bandwidth part. For the $N_{RBG}$ number of RBGs in the bandwidth part, RBG #0 to RBG #($N_{RBG}$−1) may be mapped from an MSB to an LSB of the RBG bitmap. In the case that a specific bit value in the bitmap is 1, the UE may determine that the RBG corresponding to the bit value has been allocated, and in the case that a specific bit value in the bitmap is 0, the UE may determine that the RBG corresponding to the bit value has not been allocated.

In the resource assignment type 1, RB allocation information may be notified from the base station to the UE as information on start positions and lengths of consecutively allocated VRBs. In this case, interleaving or non-interleaving may be additionally applied to the consecutively allocated VRBs. A resource assignment field of the resource assignment type 1 may include a resource indicator value (RIV), and the RIV may include a start point $RB_{start}$ of the VRB and a length $L_{RBs}$ of consecutively allocated RBs. More specifically, the RIV within the $$N_{BWP}^{size}$$

sized bandwidth part may be defined as follows.

if $$(L_{RBs} - 1) \leq \left\lfloor N_{BWP}^{size} / 2 \right\rfloor$$

then $$RIV = N_{BWP}^{size}(L_{RBs} - 1) + RB_{start}$$

else $$RIV = N_{BWP}^{size}\left(N_{BWP}^{size} - L_{RBs} + 1\right) + \left(N_{BWP}^{size} - 1 - RB_{start}\right)$$

where $L_{RBs} \geq 1$ and shall not exceed $$N_{BWP}^{size} - RB_{start}.$$

Figure 9:
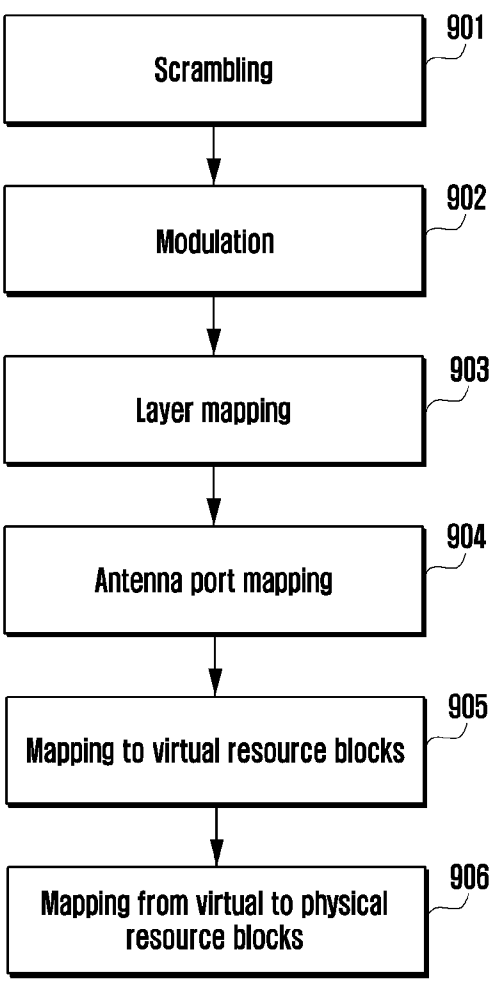
FIG. 9 is a flowchart illustrating an example of physical downlink shared channel processing in a wireless communication system according to various embodiments.

FIG. 9 is a flowchart illustrating an example of physical downlink shared channel processing in a wireless communication system according to various embodiments.

A scrambling process of one codeword or each of two codewords may be performed (901). A scrambled sequence $$\tilde{b}^{(q)}(0), \ldots, \tilde{b}^{(q)}\left(M_{bit}^{(q)} - 1\right)$$

may be acquired through a process such as Equation 2 using a scrambling sequence $c^{(q)}(j)$ acquired through initialization such as Equation 3 for a sequence $$b^{(q)}(0), \ldots, b^{(q)}\left(\left(M_{bit}^{(q)} - 1\right)\right.$$

of a codeword q having a length $$M_{bit}^{(q)}.$$

A value of $n_{ID}$ may be configured through a higher layer parameter, or, if not, $$N_{ID}^{cell}$$

may be determined as a cell ID value, and $n_{RNTI}$ may refer, for example, to an RNTI associated with PDSCH transmission.

$$\tilde{b}^{(q)}(i) = \left(b^{(q)}(i) + c^{(q)}(i)\right) \bmod 2 \quad \text{[Equation 2]}$$

$$C_{init} = n_{RNTI} \cdot 2^{15} + q \cdot 2^{14} + n_{ID} \quad \text{[Equation 3]}$$

A modulation symbol sequence $$d^{(q)}(0), \ldots , d^{(q)}\left(M_{symb}^{(q)} - 1\right)$$

having a length of $$M_{symb}^{(q)}$$

may be generated using one of a sequence $$\tilde{b}^{(g)}(0), \ldots , \tilde{b}^{(q)}\left(M_{bit}^{(q)} - 1\right)$$

of scrambled bits and various modulation schemes supported by a wireless communication system (902).

The $$M_{symb}^{layer}$$

number of modulation symbols may be mapped for each layer to the v number of layers (903), and this is expressed as $x(i)[x^{(0)}(i) \ldots x^{(v-1)}(i)]^T$. Table 12 illustrates the relationship between the number of layers, the number of codewords, and the codeword-layer mapping.

TABLE 12

| Number of layers | Number of code-words | Codeword-to-layer mapping $i = 0, 1, \ldots , M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$<br>$x^{(1)}(i) = d^{(0)}(2i + 1)$ | $M_{symb}^{layer} = M_{symb}^{(0)} / 2$ |
| 3 | 1 | $x^{(0)}(i) = d^{(0)}(3i)$<br>$x^{(1)}(i) = d^{(0)}(3i + 1)$<br>$x^{(2)}(i) = d^{(0)}(3i + 2)$ | $M_{symb}^{layer} = M_{symb}^{(0)}/3$ |
| 4 | 1 | $x^{(0)}(i) = d^{(0)}(4i)$<br>$x^{(1)}(i) = d^{(0)}(4i + 1)$<br>$x^{(2)}(i) = d^{(0)}(4i + 2)$<br>$x^{(3)}(i) = d^{(0)}(4i + 3)$ | $M_{symb}^{layer} = M_{symb}^{(0)}/4$ |
| 5 | 2 | $x^{(0)}(i) = d^{(0)}(2i)$<br>$x^{(1)}(i) = d^{(0)}(2i + 1)$<br>$x^{(2)}(i) = d^{(1)}(3i)$<br>$x^{(3)}(i) = d^{(1)}(3i + 1)$<br>$x^{(4)}(i) = d^{(1)}(3i + 2)$ | $M_{symb}^{layer} = M_{symb}^{(0)}/2 = M_{symb}^{(1)}/3$ |
| 6 | 2 | $x^{(0)}(i) = d^{(0)}(3i)$<br>$x^{(1)}(i) = d^{(0)}(3i + 1)$<br>$x^{(2)}(i) = d^{(0)}(3i + 2)$<br>$x^{(3)}(i) = d^{(1)}(3i)$<br>$x^{(4)}(i) = d^{(1)}(3i + 1)$<br>$x^{(5)}(i) = d^{(1)}(3i + 2)$ | $M_{symb}^{layer} = M_{symb}^{(0)}/3 = M_{symb}^{(1)}/3$ |
| 7 | 2 | $x^{(0)}(i) = d^{(0)}(3i)$<br>$x^{(1)}(i) = d^{(0)}(3i + 1)$<br>$x^{(2)}(i) = d^{(0)}(3i + 2)$<br>$x^{(3)}(i) = d^{(1)}(4i)$<br>$x^{(4)}(i) = d^{(1)}(4i + 1)$<br>$x^{(5)}(i) = d^{(1)}(4i + 2)$<br>$x^{(6)}(i) = d^{(1)}(4i + 3)$ | $M_{symb}^{layer} = M_{symb}^{(0)}/3 = M_{symb}^{(1)}/4$ |
| 8 | 2 | $x^{(0)}(i) = d^{(0)}(4i)$<br>$x^{(1)}(i) = d^{(0)}(4i + 1)$<br>$x^{(2)}(i) = d^{(0)}(4i + 2)$<br>$x^{(3)}(i) = d^{(0)}(4i + 3)$<br>$x^{(4)}(i) = d^{(1)}(4i)$<br>$x^{(5)}(i) = d^{(1)}(4i + 1)$<br>$x^{(6)}(i) = d^{(1)}(4i + 2)$<br>$x^{(7)}(i) = d^{(1)}(4i + 3)$ | $M_{symb}^{layer} = M_{symb}^{(0)}/4 = M_{symb}^{(1)}/4$ |

Modulation symbols mapped to a layer may be mapped to an antenna port, as illustrated in Equation 4. $\{p_0, \ldots, p_{v-1}\}$ may be determined by information included in the DCI format (904).

$$\begin{bmatrix} y^{(p_0)}(i) \\ \vdots \\ y^{(p_{v-1})}(i) \end{bmatrix} = \begin{bmatrix} x^{(0)}(i) \\ \vdots \\ x^{(v-1)}(i) \end{bmatrix} \quad \text{[Equation 4]}$$

where $i = 0, 1, \ldots , M_{symb}^{ap} - 1, M_{symb}^{ap} = M_{symb}^{layer}$.

$$y^{(p)}(0), \ldots , y^{(p)}\left(M_{symb}^{ap} - 1\right)$$

symbols that have completed the above process may be mapped to REs that satisfy conditions that may be used for transmission of a PDSCH (e.g., cannot be mapped to DM-RS resources, and the like) among REs in VRBs allocated for transmission (905).

VRBs that have completed the above process may be mapped to PRBs through an interleaving mapping scheme or a non-interleaving mapping scheme (906). The mapping scheme may be indicated through a VRB-to-PRB mapping field in DCI, and in the case that there is no indication of the mapping scheme, it may refer, for example, to a non-interleaving mapping method.

In the case that a non-interleaving mapping scheme is used, a VRB n may be mapped to a PRB n, except for specific cases. For example, the specific case may include the case that a VRB n of a PDSCH scheduled using a DCI format 1_0 through a common search space is mapped to a PRB $$n + N_{start}^{CORESET} (N_{start}^{CORESET}$$

may refer, for example, to a first PRB of a CORESET to which the DCI is transmitted).

In the case that the interleaving mapping scheme is used, RBs in the BWP may be divided into the $N_{bundle}$ number of RB bundles, and the RB bundles may be mapped through the scheme of Table 13.

An example of dividing RBs in a BWP into the $N_{bundle}$ number of RB bundles may be as follows. A set of the $$N_{BWP,i}^{size}$$

number of RBs in a BWP having a starting point $$N_{BWP,i}^{start}$$

is divided into the $$N_{bundle}=\left\lceil \left(N_{BWP,i}^{size}+\left(N_{BWP,i}^{start} \bmod L_i\right)\right)/L_i \right\rceil$$

number of RB bundles, and the RB bundles may be indexed in increasing order. Here, $L_i$ may refer, for example, to the bundle size in a BWP i, which may be transmitted to the UE by a higher layer parameter vrb-ToPRB-Interleaver. An RB bundle 0 may include the $$L_i-\left(N_{BWP,i}^{start} \bmod L_i\right)$$

number of RBs, and RB bundle $N_{bundle}-1$ may include the $$\left(N_{BWP,i}^{start}+N_{BWP,i}^{size}\right) \bmod L_i$$

number of RBs if $$\left(N_{BWP,i}^{start}+N_{BWP,i}^{size}\right) \bmod L_i>0$$

is satisfied, and may include the $L_i$ number of RBs otherwise. The remaining RB bundles may include the $L_i$ number of RBs.

TABLE 13

| |
|---|
| VRBs in $j \in \{0,1,\ldots,N_{bundle}-1\}$ may be mapped to PRBs as follows:<br>- VRB bundle $N_{bundle}-1$ may be mapped to a PRB bundle $N_{bundle}-1$<br>- The remaining VRB bundles $j \in \{0,1,\ldots,N_{bundle}-1\}$ may be mapped to a PRB bundle f(j) in the same manner as in Equation 5.<br>[Equation 5]<br>$f(j)=rC+c$<br>$j=cR+r$<br>$r=0.1.\ldots R-1$<br>$c=0.1\ldots C-1$<br>$R=2$<br>$C=\lfloor N_{bundle}/R \rfloor$ |

According to an embodiment of the disclosure, in the 5G NR system, a mcs index for the PDSCH, that is, a modulation order (or scheme) Qm, and a target code rate R may be determined through the following process.

[Example Method of Determining MCS Index Table]

For a PDSCH scheduled through a PDCCH (PDCCH with DCI format 1_0, format 1_1, or format 1_2 with CRC scrambled by a C-RNTI, MCS-C-RNTI, TC-RNTI, CS-RNTI, SI-RNTI, RA-RNTI, MSGB-RNTI, or P-RNTI) including DCI (e.g., DCI format 1_0, DCI format 1_1, or DCI format 1_2) together with a CRC scrambled by a C-RNTI, MCS-C-RNTI, TC-RNTI, CS-RNTI, SI-RNTI, RA-RNTI, MSGB-RNTI, or P-RNTI or for a PDSCH scheduled using PDSCH configuration SPS-Config (or SPS configuration) provided by higher layers without corresponding PDCCH transmission, (a) in the case that the higher layer parameter mcs-Table given by a PDSCH-Config is configured to ‘qam256’, and that the PDSCH is scheduled by a PDCCH with a DCI format 1_1 with a CRC scrambled by a C-RNTI, in order to determine a modulation order Qm and a target code rate R, the UE may use the MCS index IMCS value of Table 15.

(b) In the case that a condition (a) is not satisfied and that the UE is not configured with a mcs-C-RNTI and that an upper layer parameter mcs-Table given by a PDSCH-Config is configured to ‘qam64LowSE’ and that the PDSCH is scheduled by a PDCCH in an UE-Specific search space with a CRC scrambled by a C-RNTI, in order to determine the modulation order Qm and the target code rate R, the UE may use the MCS index IMCS value of Table 16.

(c) In the case that conditions (a) and (b) are not satisfied and that the UE is configured by a mcs-C-RNTI and that the PDSCH is scheduled by a PDCCH to which a CRC scrambled by the MCS-C-RNTI is applied, in order to determine the modulation order Qm and the target code rate R, the UE may use the MCS index IMCS value of Table 16.

(d) In the case that conditions (a), (b), and (c) are not satisfied and that the UE is not configured by a higher layer parameter mcs-Table given by an SPS-Config and that a higher layer parameter mcs-Table given by a PDSCH-Config is configured to ‘qam256’, (d-1) in the case that a PDSCH is scheduled by a PDCCH of a DCI format 1_1 to which a CRC scrambled by a CS-RNTI is applied or, (d-2) in the case that a PDSCH is scheduled without corresponding PDCCH transmission using an SPS-Config, in order to determine the modulation order Qm and the target code rate R, the UE may use the MCS index IMCS value of Table 15.

(e) In the case that conditions (a), (b), (c), and (d) are not satisfied and that the UE is configured with the upper layer parameter mcs-Table given by an SPS-Config configured to ‘qam64LowSE’, (e-1) in the case that the PDSCH is scheduled by a PDCCH to which a CRC scrambled by a CS-RNTI is applied or, (e-2) in the case that the PDSCH is scheduled without corresponding PDCCH transmission using an SPS-Config, in order to determine the modulation order Qm and the target code rate R, the UE may use the MCS index IMCS value of Table 16.

(f) In the case that conditions (a), (b), (c), (d), and (e) are not satisfied, in order determine the modulation order Qm and the target code rate R, the UE may use the MCS index IMCS value of Table 14.

TABLE 14

| MCS Index $I_{MCS}$ | Modulation Order Qm | Target code Rate [R × 1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |

TABLE 14-continued

| MCS Index $I_{MCS}$ | Modulation Order Qm | Target code Rate [R × 1024] | Spectral efficiency |
|---|---|---|---|
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

TABLE 15

| MCS Index $I_{MCS}$ | Modulation Order Qm | Target code Rate [R × 1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

TABLE 16

| MCS Index $I_{MCS}$ | Modulation Order Qm | Target code Rate [R × 1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

Figure 10:
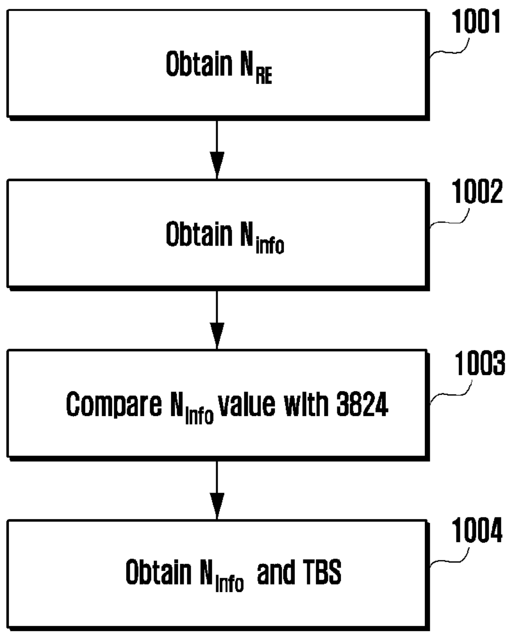
FIG. 10 is a flowchart illustrating an example method of acquiring a size of a transport block in a wireless communication system according to various embodiments.

FIG. 10 is a flowchart illustrating an example method of acquiring a transport block size (TBS) in a wireless communication system according to various embodiments. The UE may acquire (determine or calculate) the number $N_{RE}$ of REs in the slot (1001). The UE may acquire (calculate) $N'_{RE}$, which is the number of REs allocated to PDSCH mapping in one PRB within the allocated resources. $N'_{RE}$ may be calculated as $$N_{SC}^{RB} \cdot N_{symb}^{sh} - N_{DMRS}^{PRB} - N_{oh}^{PRB}.$$

Here, $$N_{SC}^{RB}$$

is 12, and $$N_{symb}^{sh}$$

may represent the number of OFDM symbols allocated to the PDSCH.

$$N_{DMRS}^{PRB}$$

is the number of REs of a DMRS of the same CDM group within one PRB.

$$N_{oh}^{PRB}$$

is the number of REs occupied by an overhead in the PRB as long as it is configured by higher signaling, and may be configured to one of 0, 6, 12, and 18 (in the case that it is not configured by higher signaling, it may be configured to 0).

The number $N_{RE}$ of total REs allocated to the PDSCH may be calculated. $N_{RE}$ is calculated based on min(156, $N'_{RE}$)·$n_{PRB}$, and $n_{PRB}$ represents the number of PRBs allocated to the UE. An $N_{RE}$ value may be calculated, as described above. Alternatively, information including the number of all cases that may be configured as the value of $N_{RE}$ (e.g., may be in the form of at least one table) may be stored, and an $N_{RE}$ value may be acquired from the stored information (e.g., table) through at least one parameter value of $$N_{SC}^{RB}, N_{symb}^{sh}, N_{DMRS}^{PRB}, N_{oh}^{PRB}, \text{ or } n_{PRB}.$$

The UE may acquire (calculate) the number $N_{info}$ of temporary information bits (1002). For example, the temporary information bit number $N_{info}$ may be calculated as $N_{RE}$*R*$Q_m$*v. Here, R denotes a code rate and Qm denotes a modulation order, and the information may be determined based on modulation and coding scheme (MCS) information included in control information (e.g., DCI, RRC configuration information, and the like) Specifically, pre-promised information (e.g., MCS index tables of Tables 12, 13, and 14) on the code rate and modulation order may be used, and the code rate and modulation order may be determined based on the MCS information and the pre-promised information. v may refer, for example, to the number of allocated layers. An $N_{info}$ value may be calculated as described above, or information including the number of all cases (e.g., the form of at least one table) may be stored, and an $N_{info}$ value may be acquired from the stored information through at least one parameter value of R, Qm, or v.

The UE may compare the acquired (calculated) $N_{info}$ value with 3824 (1003). According to whether the value of $N_{info}$ is less than or equal to or greater than 3824, $N'_{info}$ and TBS may be acquired (calculated) in a different method (1004).

In the case of $N_{info} \leq 3824$, $N'_{info}$ may be calculated through formulas of $$N'_{info} = \max\left(24, 2^n * \left\lfloor \frac{N_{info}}{2^n} \right\rfloor\right) \text{ and } n = \max(3, \lfloor \log_2(N_{info}) \rfloor - 6).$$

The $N'_{info}$ value may be calculated, as described above, or information on the number of all cases (e.g., at least one table) may be stored, and an $N'_{info}$ value may be acquired from the stored information through at least one parameter value of $N'_{info}$ or n. The TBS may be determined as a value closest to $N'_{info}$ among values not less than $N'_{info}$ in Table 17.

TABLE 17

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |

TABLE 17-continued

| Index | TBS |
|---|---|
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |

TABLE 17-continued

| Index | TBS |
|---|---|
| 89 | 3368 |
| 90 | 3496 |
| 91 | 3624 |
| 92 | 3752 |
| 93 | 3824 |

In the case of $N_{info}$>3824, $N'_{info}$ may be calculated through formulas of $$N'_{info} = \max\left(3840, 2^n \times \text{round}\left(\frac{N_{info} - 24}{2^n}\right)\right) \text{ and } n = \lfloor \log_2(N_{info} - 24) \rfloor - 5.$$

The $N'_{info}$ value may be calculated, as described above or information on the number of all cases (e.g., at least one table) may be stored, and the $N'_{info}$ value may be acquired from the stored table through at least one parameter value of $N'_{info}$ or n. TBS may be determined through the $N'_{info}$ value and pseudo codes included in Table 18 or other types of pseudo codes that produce the same results. Alternatively, in the TBS, information on the number of all cases (e.g., at least one table) may be stored, and the TBS value may be acquired from the stored information through at least one parameter value of R, $N'_{info}$, or C.

TABLE 18 if R ≤ 1/4

$$TBS = 8 * C * \left\lceil \frac{N'_{info} + 24}{8 * C} \right\rceil - 24, \text{ where } C = \left\lceil \frac{N'_{info} + 24}{3816} \right\rceil$$

else if $N'_{info} > 8424$ $$TBS = 8 * C * \left\lceil \frac{N'_{info} + 24}{8 * C} \right\rceil - 24, \text{ where } C = \left\lceil \frac{N'_{info} + 24}{8424} \right\rceil$$

else $$TBS = 8 * C * \left\lceil \frac{N'_{info} + 24}{8 * C} \right\rceil - 24$$

end if end if

A maximum data rate supported by the UE in the NR system may be determined through Equation 6.

data rate (in Mbps) = [Equation 6]

$$10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j),\mu} \cdot 12}{T_s^\mu} \cdot \left(1 - OH^{(j)}\right) \right)$$

In Equation 6, J is the number of carriers bundled by carrier aggregation, $$R\text{max} = 948/1024, \; v_{Layers}^{(j)}$$

may refer, for example, to the maximum number of layers, $$Q_m^{(j)}$$

may refer, for example, to a maximum modulation order, $f^{(i)}$ may refer, for example, to a scaling index, and μ may refer, for example, to subcarrier spacing. The UE may configure and report $f^{(j)}$ to one value of 1, 0.8, 0.75, and 0.4, and μ may be given, as illustrated in Table 19.

TABLE 19

| μ | $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

$$T_s^\mu$$

is an average OFDM symbol length, $$T_s^\mu$$

may be calculated as $$\frac{10^{-3}}{14 \cdot 2^\mu},$$

and $$N_{PRB}^{BW(j),\mu}$$

is the number of maximum RBs in BW (j). $OH^{(j)}$ is an overhead value, which may be given as 0.14 in the downlink of FR1 (band of 6 GHz or less), as 0.18 in the uplink, as 0.08 in the downlink of FR2 (band exceeding 6 GHz), and as 0.10 in the uplink. For example, through Equation 6, the maximum data rate in the downlink in a cell having a frequency bandwidth of 100 MHz at subcarrier spacing of 30 kHz may be the same as that of Table 20.

TABLE 20

| $f^{(j)}$ | $v^{(j)}_{Layers}$ | $Q^{(j)}_m$ | Rmax | $N^{BW(j),\mu}_{PRB}$ | $T^{\mu}_s$ | $OH^{(j)}$ | data rate |
|---|---|---|---|---|---|---|---|
| 1 | 4 | 8 | 0.92578125 | 273 | 3.57143E | 0.14 | 2337.0 |
| 0.8 | 4 | 8 | 0.92578125 | 273 | 3.57143E–05 | 0.14 | 1869.6 |
| 0.75 | 4 | 8 | 0.92578125 | 273 | 3.57143E–05 | 0.14 | 1752.8 |
| 0.4 | 4 | 8 | 0.92578125 | 273 | 3.57143E–05 | 0.14 | 934.8 |

An actual data rate representing actual data transmission efficiency may be a value acquired by dividing a transmission data amount by a data transmission time. That is, the actual data rate may be a value acquired by dividing a TBS by a transmission time interval (TTI) length in 1 TB transmission or a value acquired by dividing the sum of two TBSs by a transmission time interval (TTI) length in 2 transmissions. A maximum actual downlink data rate in a cell having 30 kHz subcarrier spacing and a 100 MHz frequency bandwidth may be determined, as illustrated in Table 21 according to the number of allocated PDSCH symbols.

TABLE 21

| $N^{sh}_{symb}$ | $N^{PRB}_{DMRS}$ | $N'_{RE}$ | $N_{RE}$ | $N_{info}$ | n | $N'_{info}$ | C | TBS | TTI length (ms) | data rate (Mbps) |
|---|---|---|---|---|---|---|---|---|---|---|
| 3 | 8 | 28 | 7644 | 226453.5 | 12 | 225,280 | 27 | 225,480 | 0.107143 | 2,104.48 |
| 4 | 8 | 40 | 10920 | 323505.0 | 13 | 319,488 | 38 | 319,784 | 0.142857 | 2,238.49 |
| 5 | 8 | 52 | 14196 | 420556.5 | 13 | 417,792 | 50 | 417,976 | 0.178571 | 2,340.67 |
| 6 | 8 | 64 | 17472 | 517608.0 | 13 | 516,096 | 62 | 516,312 | 0.214286 | 2,409.46 |
| 7 | 8 | 76 | 20748 | 614659.5 | 14 | 622,592 | 74 | 622,760 | 0.250000 | 2,491.04 |
| 8 | 8 | 88 | 24024 | 711711.0 | 14 | 704,512 | 84 | 704,904 | 0.285714 | 2,467.16 |
| 9 | 8 | 100 | 27300 | 808762.5. | 14 | 802,816 | 96 | 803,304 | 0.321429 | 2,499.17 |
| 10 | 8 | 112 | 30576 | 905814.0 | 14 | 901,120 | 107 | 901,344 | 0.357143 | 2,523.76 |
| 11 | 8 | 124 | 33852 | 1002865.5 | 14 | 999,424 | 119 | 999,576 | 0.392857 | 2,544.38 |
| 12 | 8 | 136 | 37128 | 1099917.0 | 15 | 1,114,112 | 133 | 1,115,048 | 0.428571 | 2,601.78 |
| 13 | 8 | 148 | 40404 | 1196968.5 | 15 | 1,212,416 | 144 | 1,213,032 | 0.464286 | 2,612.68 |
| 14 | 8 | 160 | 43680 | 1294020.0 | 15 | 1,277,952 | 152 | 1,277,992 | 0.500000 | 2,555.98 |

With reference to the maximum data rate supported by the UE as illustrated in Table 20 and the actual data rate according to the allocated TBS as illustrated in Table 21, it may be identified that there is the case that the actual data rate is greater than the maximum data rate supported by the UE according to scheduling information.

In a wireless communication system or an NR system, a data rate supportable by the UE may be determined (calculated or acquired) between the base station and the UE using a maximum frequency band, a maximum modulation order, and a maximum number of layers supported by the UE. However, the data rate supportable by the UE may be different from the actual data rate calculated based on the TBS and TTI, and in some cases, there may occur the case that the base station transmits data with a larger TBS than the data rate supportable by the UE to the UE.

According to an embodiment of the disclosure, the base station may configure configuration information on the SPS to the UE through higher layer signaling (e.g., RRC signaling). For example, the configuration information may be transmitted to the UE through the SPS-Config IE. The configuration information may include, for example, information of at least Table 22. The base station may configure a plurality of SPSs using configuration information of, for example, Table 22 according to the capability of the UE. The plurality of SPSs may be distinguished by the sps-ConfigIndex of Table 22. According to the disclosure, the sps-ConfigIndex may be referred to as an SPS index. The SPS configuration (or SPS configuration information) may be performed for each BWP of a serving cell, and a plurality of SPS configurations may be simultaneously activated within the same BWP.

TABLE 22

SPS-Config information element

SPS-Config ::= SEQUENCE { periodicity ENUMERATED { ms10, ms20, ms32, ms40, ms64, ms80, ms128, ms160, ms320, ms640, spare6, spare5, spare4, spare3, spare2, spare1}, (period of DL SPS)

nrofHARQ-Processes INTEGER (1..8), (number of HARQ processes configured to DL SPS)

n1PUCCH-AN PUCCH-ResourceId OPTIONAL, -- Need M (configure HARQ resource of a PUCCH for a DL SPS, a format0, or a format1)

mcs-Table ENUMERATED { qam64LowSE} OPTIONAL, -- Need S (Configuration information related to a mcs table used for a DL SPS)

...,

[[ sps-ConfigIndex-r16 SPS-ConfigIndex-r16 OPTIONAL, -- Cond SPS-List (index for multiple SPSs when configuring multiple SPSs)

harq-ProcID-Offset-r16 INTEGER (0..15) OPTIONAL, -- Need R (offset used when deriving a HARQ process ID)

TABLE 22-continued periodicityExt-r16 INTEGER (1..5120) OPTIONAL, -- Need R (period of a DL SPS, ignore a periodicity field, if this field exists)
harq-CodebookID-r16 INTEGER (1..2) OPTIONAL, -- Need R (HARQ-ACK codebook index corresponding to a HARQ-ACK codebook for SPS PDSCH and SPS PDSCH release)
pdsch-AggregationFactor-r16 ENUMERATED {n1, n2, n4, n8 } OPTIONAL -- Need S (number of repetitions of an SPS PDSCH, and if this field does not exist, use a PDSCH aggregation factor of PDSCH-Config.) ]]
}

The base station may instruct the UE to activate or release at least one of SPSs configured through a control signal (e.g., DCI or MAC CE). For example, the base station may configure at least one specific field in the DCI to a specific value, scramble a CRC generated through the DCI with a specific RNTI, and transmit the CRC to the UE through a PDCCH, thereby instructing to activate or release the SPS. More specifically, the CRC is scrambled using a CS-RNTI (provided to the UE by an RRC configuration), a value of a new data indicator (NDI) field in the DCI is configured to 0, and if a DFI flag field exists, a value of a new data indicator (NDI) field in the DCI is configured to 0, and in the case that the SPS is activated, if the PDSCH-to-HARQ_feedback timing indicator field exists and a value of the field satisfies the condition of not providing an inapplicable value among values of dl-DataToUL-ACK, the DCI may be interpreted as activation or inactivation. In the case that an SPS configuration is 1, all of the HARQ process number fields of the DCI are configured to 0, and if all of redundancy version fields are configured to 0, the DCI may be interpreted as activation, and all of the HARQ process number fields of the DCI are configured to 0, all of the redundancy version fields are configured to 0, all of the modulation and coding scheme fields are configured to 1, in case of an FDRA type 0 or dynamicSwitch (e.g., in the case that the resource assignment type may be changed based on DCI), all FDRA fields are configured to 0, and in the case of an FDRA type 1, if all FDRA fields are configured to 1, the DCI may be interpreted as inactivation. In the case that there are multiple SPS configurations, the HARQ process number field in DCI indicates an sps-ConfigIndex in the SPS-config. configuration, and if the redundancy version fields of the DCI are all configured to 0, the redundancy version fields of the DCI are all configured to 0 with the activation of the SPS corresponding to the sps-ConfigIndex, and the modulation and coding scheme fields are all configured to 1, and in case of the FDRA type 0 or dynamicSwitch, FDRA fields are all configured to 0, and in case of the FDRA type 1, if all FDRA fields are configured to 1, it may be interpreted as inactivation of the SPS corresponding to the sps-ConfigIndex.

When the UE receives DCI indicating deactivation, in the case that configured downlink assignment of the corresponding serving cell exists, the UE may clear the configured downlink assignment, and in the case that the timeAlignmentTimer associated with the TAG including a serving cell to which HARQ feedback is to be transmitted is running, the UE may transmit an ACK for deactivation.

When the UE receives DCI indicating activation, the UE may store downlink assignment of the corresponding serving cell and associated HARQ information as configured downlink assignment, and (re-)initialize the configured downlink assignment of the corresponding serving cell.

The base station may configure a value of an NDI field of the DCI to 1, scramble a CRC of the DCI with a CS-RNTI, and transmit the CRC through the PDCCH to schedule retransmission of a transmitted SPS PDSCH.

The base station may transmit the PDSCH to a resource determined according to the RRC configuration and activated DCI signal. More specifically, the transmission slot of the Nth PDSCH may be determined, as illustrated in Equation 7. An HARQ process ID associated with SPS transmission may be determined as illustrated in Equation 8 in the case that harq-ProcID-Offset is not configured and as illustrated in Equation 9 in the case that harq-ProcID-Offset is configured.

$$(numberOfSlotsPerFrame \times SFN + \text{slot number in the frame}) = [(numberOfSlotsPerFrame \times SFN_{start\ time} + \text{slot}_{start\ time}) + N \times \text{periodicity} \times numberOfSlotsPerFrame/10] \text{ modulo } (1024 \times numberOfSlotsPerFrame) \quad \text{[Equation 7]}$$

$SFN_{start\ time}$ and $\text{slot}_{start\ time}$ indicate the SFN and slot of first PDSCH transmission in which the configured downlink assignment is (re-)initialized, and a numberOfSlotsPerFrame indicates the number of slots included in the frame.

$$HARQ \text{ Process ID} = [\text{floor}(\text{CURRENT\_slot} \times 10/(numberOfSlotsPerFrame \times \text{periodicity}))] \text{ modulo } nrofHARQ\text{-Processes} \quad \text{[Equation 8]}$$

CURRENT_slot=[(SFN×numberOfSlotsPerFrame)+slot number in the frame]

The CURRENT_slot indicates a slot index at a first transmission time point of a bundle of configured downlink assignment $$HARQ \text{ Process ID} = [\text{floor}(\text{CURRENT\_slot} \times 10/(numberOfSlotsPerFrame \times \text{periodicity}))] \text{ modulo } nrofHARQ\text{-Processes} + harq\text{-}ProcID\text{-Offset} \quad \text{[Equation 9]}$$

CURRENT_slot=[(SFN×numberOfSlotsPerFrame)+slot number in the frame]

The CURRENT_slot indicates a slot index at a first transmission time point of a bundle of configured downlink assignment 1. Mcs-Table Configuration for Group-Common SPS PDSCH According to an embodiment of the disclosure, the base station may transmit data to the UE in a 1:1 relationship (uni-cast) or in a 1:N relationship (multi-cast, group-cast, broad-cast, and the like).

According to an embodiment of the disclosure, the base station may configure a unicast SPS configuration and/or a group-common SPS configuration to the UE. The unicast SPS configuration may include a CS-RNTI scrambling a CRC of DCI indicating activation or release of a unicast SPS, and the group-common SPS configuration may include a group common CS-RNTI scrambling a CRC of DCI indicating activation or release of a group-common SPS.

According to an embodiment of the disclosure, DCI to which a CRC (CRC generated using DCI information) scrambled based on a group-common CS-RNTI is attached may be transmitted through a group-common PDCCH. The DCI may activate or release a group-common SPS PDSCH. After the group-common SPS PDSCH is activated, a group-common SPS PDSCH may be transmitted according to at least an embodiment described above. In this case, the RNTI used in Equation 3 of the process 901 may be the group-common CS-RNTI, and the group-common CS-RNTI may be configured to the same value for the UEs of the group.

The group common CS-RNTI of the disclosure may be a newly defined RNTI for group communication or may be an RNTI configured to be used for group communication among RNTIs configured to the UE. In the disclosure, a PDSCH configured through an SPS configuration may be referred to as an SPS PDSCH. However, this indicates that the PDSCH configured by the SPS configuration and may be described in various terms of the same meaning.

According to an embodiment of the disclosure, DCI to which a CRC (CRC generated using DCI information) scrambled based on a UE-specific CS-RNTI is attached may be transmitted through a UE-specific PDCCH. The DCI may activate or release a group-common SPS PDSCH. After the group-common SPS PDSCH is activated, a group-common SPS PDSCH may be transmitted according to at least an embodiment described above. In this case, the RNTI used in Equation 3 of the process 901 may be a group-common CS-RNTI, and the same value may be configured for the UEs of the group.

According to an embodiment of the disclosure, the base station may configure a mcs-Table (e.g., Table 14, 15, or 16) for transmitting a group-common SPS PDSCH to the UE. Hereinafter, in the disclosure, information on at least one modulation order and target code rate that may be determined according to at least one MCS index value may be referred to as mcs-Table information, and it may be referred to as other terms (e.g., MCS related information). The mcs-Table (mcs-Table for group SPS communication or group-common SPS mcs-Table) for transmitting a group-common SPS PDSCH configured to the UE may be configured separately from the mcs-Table (or UE-specific SPS mcs-Table) configured for a unicast SPS PDSCH. For example, the mcs-Table for transmitting a group-common SPS PDSCH may be defined (or designed) or configured in consideration of a lower performance than that of the mcs-Table for a unicast SPS PDSCH. However, an embodiment of the disclosure is not limited thereto, and the mcs-Table for transmitting a group-common SPS PDSCH may include at least one or at least a part of mcs-Table entries configured for a unicast SPS PDSCH.

According to an embodiment of the disclosure, the mcs-Table configuration for transmitting a group-common SPS PDSCH may be included in the SPS configuration parameter in the BWP configuration parameter to be configured for each BWP and/or for each sps-ConfigIndex within the BWP.

For example, downlink BWP configuration information (BWP-Downlink) and uplink BWP configuration information (BWP-Uplink) may be configured to the UE. The downlink BWP may include configuration information on a downlink common BWP (BWP-DownlinkCommon) and a downlink dedicated BWP (BWP-DownlinkDedicated). The downlink common BWP is a cell-specific BWP, and the downlink common BWP configuration information may include parameters commonly applied to UEs located in a cell. The downlink-specific BWP is a UE-specific BWP, and the downlink-dedicated BWP configuration information may include a UE-dedicated parameter. In the disclosure, a BWP including a group-common SPS PDSCH may be referred to as a group common BWP. That is, the group common BWP may refer, for example, to a BWP used for 1:multiple communication such as multicast or broadcast. The group common BWP may be configured to the UE as a BWP separate from the previously configured legacy BWP, or some frequency resources among BWPs configured to the UE may be configured to the UE as the group common BWP.

In the case that the group common BWP is configured to the UE as a BWP separate from the legacy BWP, configuration information for the group common BWP may be included in the downlink common BWP, or configuration information for the group common BWP may be separately defined. Configuration information for the group common BWP may include information on a group common PDCCH area, information on a group common PDSCH area, group-common SPS configuration information, and the like.

In the case that a specific frequency resource among BWPs configured to the UE is configured to the UE as the group common BWP, for example, the UE may use all or part of the downlink common BWP as the group common BWP. Alternatively, some BWPs or frequency resources among a plurality of BWPs configured to the UE may be used as the group common BWP.

Therefore, according to an embodiment of the disclosure, in the case that a group common BWP is configured as a BWP separate from the BWP of the UE or in the case that a specific frequency resource among BWPs configured to the UE is configured as the group common BWP, a configuration for the mcs-Table may be included in group-common SPS configuration information included in the group common BWP configuration information.

According to an embodiment of the disclosure, the mcs-Table configuration for transmitting a group-common SPS PDSCH may be included in a group common frequency resource configuration parameter for group common PDSCH transmission to be configured for each group common frequency resource.

The group common frequency resource may include some or all resources of the BWP, and in the disclosure, the group common frequency resource may include all or at least some of the frequency resources of the group common BWP. Therefore, the group common frequency resource may also be configured as part of the frequency resource configured to the UE or as a frequency resource separate from the frequency resource configured to the UE, and a mcs-Table configuration for transmitting the group-common SPS PDSCH may be included in information for configuring the group common frequency resource.

According to an embodiment of the disclosure, DCI to which a scrambled CRC (CRC generated using DCI information) is attached based on a group-common CS-RNTI may be received through a group-common PDCCH. In order to determine the modulation order Qm and target code rate R corresponding to the modulation and coding scheme field IMCS included in the DCI, the UE may use the mcs-Table configured for transmitting a group-common SPS PDSCH. In the case that the mcs-Table configured for transmitting the group-common SPS PDSCH does not exist, the UE may determine a modulation order Qm and a target code rate R corresponding to the modulation and coding scheme field IMCS included in the DCI using the mcs-Table configured for the unicast PDSCH, the mcs-Table configured for the unicast SPS PDSCH, or the mcs-Table configured for the group common PDSCH. In this case, the DCI to which a scrambled CRC is attached based on the group common CS-RNTI may use a DCI format separately defined for group communication or a predefined DCI format for unicast communication.

According to an embodiment of the disclosure, in the case of receiving a PDCCH scheduled through a group-specific search space, in order to determine a modulation order Qm and a target code rate R corresponding to a modulation and coding scheme field IMCS included in the DCI, the UE may use the mcs-Table configured for transmitting a group-common SPS PDSCH. In the case that the mcs-Table configured for transmitting the group-common SPS PDSCH does not exist, the UE may determine a modulation order Qm and a target code rate R corresponding to the modulation and coding scheme field IMCS included in the DCI using the mcs-Table configured for the unicast PDSCH, the mcs-Table configured for the unicast SPS PDSCH, or the mcs-Table configured for the group common PDSCH. DCI transmitted through a group-specific search space may use a separately defined DCI format for group communication or a predefined DCI format for unicast communication.

According to an embodiment of the disclosure, DCI to which a scrambled CRC (CRC generated using DCI information) is attached based on a group-common CS-RNTI may be received through a group-specific search space of a group-common PDCCH. In order to determine the modulation order Qm and target code rate R corresponding to the modulation and coding scheme field IMCS included in the DCI, the UE may use the mcs-Table configured for transmitting a group-common SPS PDSCH. In the case that the mcs-Table configured for transmitting the group-common SPS PDSCH does not exist, the UE may determine a modulation order Qm and a target code rate R corresponding to the modulation and coding scheme field IMCS included in the DCI using the mcs-Table configured for the unicast PDSCH, the mcs-Table configured for the unicast SPS PDSCH, or the mcs-Table configured for the group common PDSCH.

Figure 11:
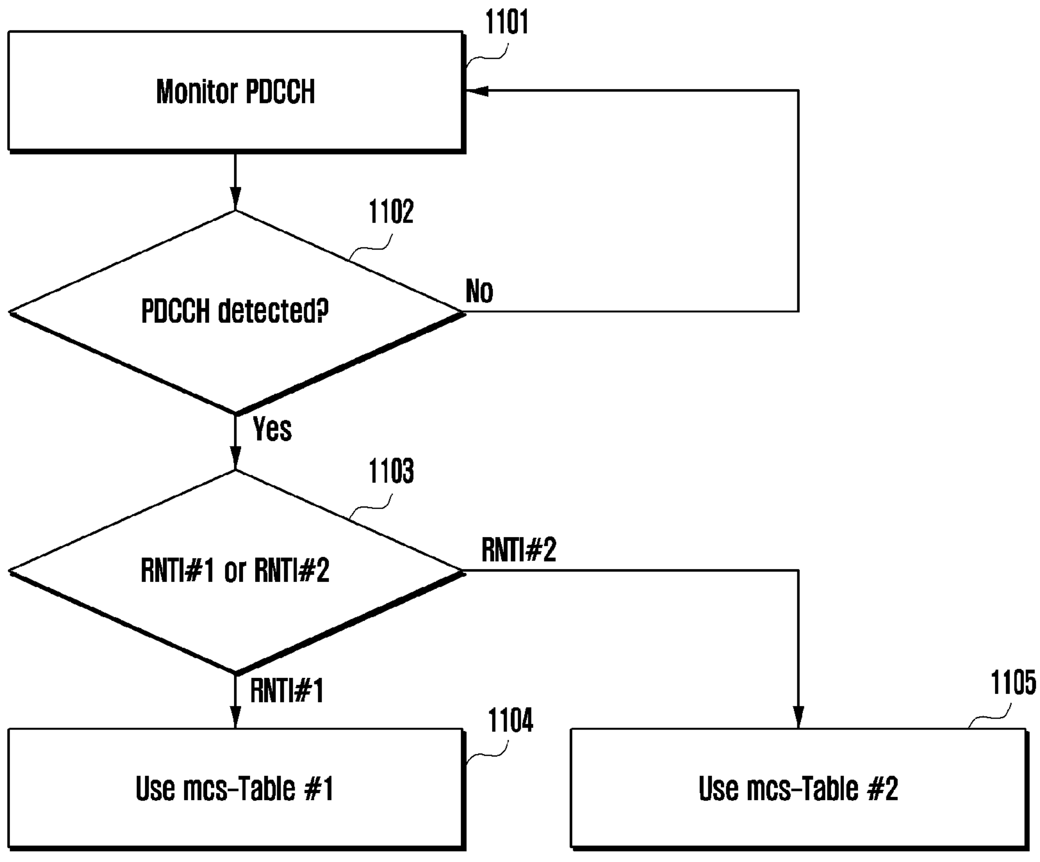
FIG. 11 is a flowchart illustrating an example operation of determining a modulation and coding scheme (mcs)-Table of a terminal according to various embodiments.

FIG. 11 is a flowchart illustrating an example operation of a UE according to various embodiments.

With reference to FIG. 11, the UE may receive configuration information from a base station. The configuration information may be received through RRC signaling, MIB, or SIB.

The configuration information may include information on a BWP, and in the disclosure, the configuration information may include information on a mcs-Table. As described above, the mcs-Table may include at least one of a mcs-Table configured for a unicast PDSCH, a mcs-Table configured for a group common PDSCH, a mcs-Table configured for a unicast SPS PDSCH, or a mcs-Tables configured for a group-common SPS PDSCH. As described above, the mcs-Table configured for the group common PDSCH and the mcs-Table configured for the group-common SPS PDSCH may be configured for each BWP or for each group common frequency resource. In this case, specific contents of configuration information on the BWP or configuration information on a group common frequency resource are the same as described above, and will be omitted below.

The UE may monitor the PDCCH in at least one search space according to the above embodiments (1101). The search space may include a common search space. The common search space may include a group search space commonly configured only to a specific group i for group communication. Further, the search space may include a UE-specific search space. The UE-specific search space may include a group search space commonly configured only to a specific group i for group communication.

For example, the group search space commonly configured only to the group i may be obtained by configuring an Yp,−1 value of Equation 1 to the group common RNTI and substituting it into Equation 1. A UE included in a group may monitor a PDCCH in the group search space, and information included in DCI received in the group search space may be used for group communication of the UE.

The base station may transmit information on the group search space to the UE. The base station may configure information on a PDCCH in which the group search space is located (or to be used for group communication) to the UE through RRC signaling or SIB. In this case, time resource information and frequency resource information on the CORESET may be directly indicated through RRC signaling, MIB, or SIB. Alternatively, time resource information and frequency resource information on the PDCCH may enable to indicate any one of predetermined information (e.g., information in the form of a table) through information included in RRC signaling, MIB, or SIB. Further, a CCE index of a common search space included in the PDCCH may be determined based on the above-described Equation 1.

DCI may be received (detected) as a result of monitoring by the UE (1102). That is, as a result of monitoring the PDCCH, the UE may receive DCI through the PDCCH. The UE may determine whether the received DCI satisfies the above-described SPS activation condition.

In the case that DCI is received (detected), the UE may identify whether an RNTI used for scrambling a CRC of the DCI transmitted through the PDCCH is a first RNTI or a second RNTI (1103). As described above, the UE included in a group i may receive allocation of a group common RNTI (may be received through higher layer signaling, MIB, or SIB), and in the case that the group common RNTI is allocated, step 1103 may be performed. In the disclosure, the second RNTI may refer to a group common RNTI or a group common CS-RNTI, and the first RNTI may refer to an RNTI (e.g., C-RNTI, CS-RNTI, and the like) other than the group common RNTI configured to the UE. In the disclosure, step 1103 may be step of identifying whether an RNTI used for scrambling a CRC of the DCI is the second RNTI. That is, the UE may identify whether a scrambled CRC is attached based on the group common RNTI and identify whether scheduling information on group communication is received based on this.

However, in the case that the group search space is a search space commonly configured only to a group i based on the group common RNTI, DCI received in the group search space is group common DCI; thus, step 1103 may be omitted.

Further, step 1103 may be changed to step of determining whether the DCI is for group communication (or whether the DCI is group common or UE-specific).

In the case that the RNTI is the first RNTI, the UE may use a first mcs-Table (or mcs-Table #1) (1104). That is, the UE may identify at least one of a target code rate R or a modulation order Qm corresponding to a value of the MCS index IMCS bit field included in the received DCI.

In the case that the RNTI is the second RNTI, the UE may use a second mcs-Table (or mcs-Table #2) (1105). That is, the UE may identify at least one of a modulation order Qm or a target code rate R corresponding to a mcs index IMCS value included in the received DCI.

The UE may determine a modulation order Qm and a target code rate R of a PDSCH scheduled by the DCI based on the identified at least one modulation order Qm and target code rate R, and perform a subsequent operation, for example, determination of the TBS.

The first mcs-Table may correspond to a mcs-Table configured for a unicast PDSCH or a unicast SPS PDSCH, and the second mcs-Table may correspond to a mcs-Table configured for a group common PDSCH or a group-common SPS PDSCH.

Figure 12:
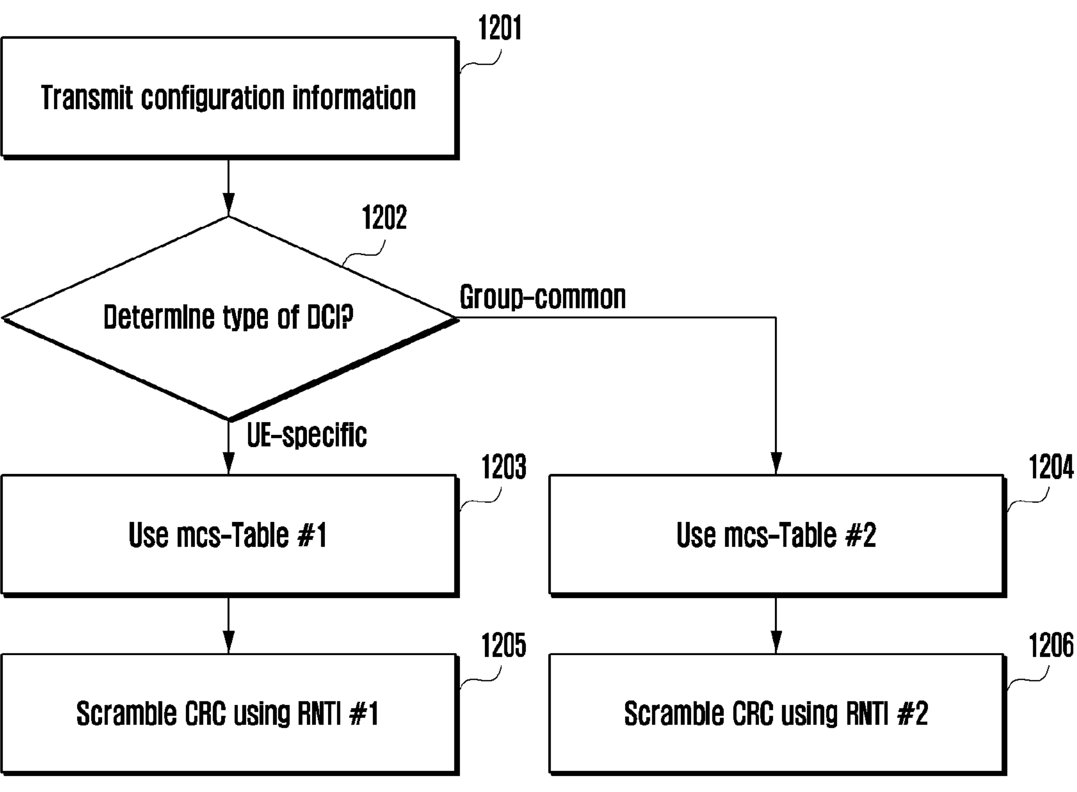
FIG. 12 is a flowchart illustrating an example DCI generation operation of a base station according to various embodiments.

FIG. 12 is a flowchart illustrating an example DCI generation operation of a base station according to various embodiments.

With reference to FIG. 12, the base station may transmit configuration information to the UE (1201). The configuration information may refer, for example, to information transmitted through RRC signaling, MIB, or SIB.

The configuration information may include information on a BWP, and in the disclosure, the configuration information may include information on a mcs-Table. As described above, the mcs-Table may include at least one of a mcs-Table configured for a unicast PDSCH, a mcs-Table configured for a group common PDSCH, a mcs-Table configured for a unicast SPS PDSCH, or a mcs-Table configured for a group-common SPS PDSCH. As described above, the mcs-Table configured for the group common PDSCH and the mcs-Table configured for the group-common SPS PDSCH may be configured for each BWP or for each group common frequency resource. In this case, specific contents of configuration information on BWP or configuration information on the group common frequency resource are the same as described above, and will be omitted below.

The base station may determine a type of DCI to transmit (1202). However, step 1202 may be omitted. Specific details thereof will be described in greater detail below.

For example, the base station may determine a type of DCI according to data to be transmitted through the PDSCH (or according to whether the data is data for group communication or according to whether the data is group common data or UE-specific data). Further, the base station may determine at least part of a DCI type, a field value included in DCI, or an RNTI to be used for scrambling a CRC generated using DCI according to whether the data is for activating group SPS PDSCH transmission or unicast SPS PDSCH transmission.

For example, a type of DCI may be determined according to whether the data is data transmitted to one UE or data transmitted to UEs (e.g., multiple UEs) belonging to a specific group. The base station may determine a modulation order Qm and a target code rate R of data to be transmitted through the PDSCH, and determine a value of a mcs index IMCS for indicating the modulation order Qm and/or the target code rate R. In this case, the MCS index may be determined using different mcs-Tables according to the data (e.g., according to whether the data is data transmitted for group communication, data for unicast transmission, data for group SPS PDSCH transmission, or data for unicast SPS PDSCH transmission) or according to the determined DCI type, and a detailed description thereof will be described later. However, as described above, the DCI type (or format) for group communication and the DCI type (or format) for unicast communication may be the same, and in this case, step 1202 may be omitted.

The base station may determine a type of DCI according to whether the DCI to be transmitted through the PDCCH is for group communication (or whether the DCI is group common or UE-specific, and whether group SPS PDSCH transmission or unicast SPS PDSCH transmission)(1202). For example, the DCI may be for one UE (UE-specific) or a specific group (group-common). Therefore, the base station may determine a modulation order Qm and a target code rate R of data to be transmitted through the PDSCH scheduled by the DCI and determine a value of a mcs index IMCS for indicating the modulation order Qm and/or the target code rate R. In this case, the MCS index may be determined using different mcs-Tables according to the determined DCI type, and a detailed description thereof will be described later. However, as described above, the DCI type (or format) for group communication and the DCI type (or format) for unicast communication may be the same, and in this case, step 1202 may be omitted.

In the case that the determined DCI is UE-specific, the base station may generate DCI using a mcs-Table #1 (1203), generate a CRC using the generated DCI, and scramble the CRC using the first RNTI (1205). The first mcs-Table may be a mcs-Table configured to the UE for a unicast PDSCH or a unicast SPS PDSCH through a process of step 1201, and the RNTI is a UE-specific RNTI and may include, for example, a C-RNTI or CS-RNTI. The base station may transmit the DCI and CRC generated as described above through the PDCCH.

In the case that the determined DCI type is group-common, the base station may generate DCI using a second mcs-Table (1204), generate a CRC using the generated DCI, and scramble the CRC using the second RNTI (1206). The second mcs-Table may be a mcs-Table configured to the UE for a group common PDSCH or a mcs-Table configured for a group-common SPS PDSCH through the process of step 1201, and the RNTI may include a group-common RNTI or a group-common CS-RNTI. The base station may transmit the DCI and CRC generated as described above through the PDCCH. The PDCCH may be mapped to a common search space or a group search space and transmitted.

2. Group Common SPS Activation Through UE-Specific PDCCH

According to an embodiment of the disclosure, the base station may configure configuration information on the SPS to the UE through higher layer signaling (e.g., RRC signaling). The SPS configuration may include a unicast SPS configuration and a group-common SPS configuration for transmission of a group common PDSCH. The base station may configure the UE so that the sum of the number of unicast SPS configurations and the number of group-common SPS configurations does not exceed the capability of the UE.

For example, in the case that the $N_1$ number of unicast SPS configurations are configured to a UE capable of supporting the N number of SPS configurations, the base station may configure the maximum $N-N_1$ number (e.g., $N-N_1$ number or less) of group-common SPS configurations to the UE using an sps-ConfigToAddModList.

For another example, in the case that the $N_2$ number of group-common SPS configurations are configured to a UE capable of supporting the N number of SPS configurations, the base station may configure the maximum $N-N_2$ number (or $N-N_2$ number or less) of unicast SPS configurations to the UE using an sps-ConfigToAddModList.

For another example, in the case that the $N_1$ number of unicast SPS configurations are configured to a UE capable of supporting the N number of SPS configurations, the base station may release some of the $N_i$ number of unicast SPS configurations using an sps-ConfigToReleaseList, additionally configure the $N_2$ number of group-common SPSs using an sps-ConfigToAddModList, and enable the total sum of the number of SPS configurations to not exceed N.

For another example, in the case that the $N_2$ number of group-common SPS configurations are configured to a UE capable of supporting the N number of SPS configurations, the base station may release some of the $N_2$ number of group-common SPS configurations using an sps-ConfigToReleaseList, additionally configure the $N_1$ number of unicast SPSs using an sps-ConfigToAddModList, and enable the total sum of the number of SPS configurations to not exceed N.

The UE may transmit information on the maximum number of SPS configurations to the base station through a UE capability message. The UE may receive a message requesting a UE capability message (UE capability inquiry message) from the base station and accordingly transmit the UE capability message or may transmit the UE capability message after an RRC connection with the base station is established. Therefore, in the case that the base station receives the UE capability message in advance, a procedure of transmitting the UE capability message may be omitted.

According to an embodiment of the disclosure, in the case that a HARQ process number field value in the first DCI satisfying an SPS activation condition is $m_1$ and that a CRC of the first DCI is scrambled with the first CS-RNTI, an SPS configuration having a value corresponding to $m_1$ may be activated. Further, the SPS PDSCH may be scrambled (process 901 of FIG. 9) and transmitted based on an initialization factor determined using the first CS-RNTI and Equation 3.

Further, in the case that a HARQ process number field value in a second DCI field satisfying the SPS activation condition is $m_2$ and that a CRC of the second DCI is scrambled with the second CS-RNTI, the SPS configuration having a value corresponding to $m_1$ may be activated. Further, the SPS PDSCH may be scrambled (process 901 of FIG. 9) and transmitted based on the initialization factor determined using the second CS-RNTI and Equation 3.

The first CS-RNTI may be a CS-RNTI for a unicast SPS, and the second CS-RNTI may be a group common CS-RNTI for a group-common SPS. Further, the first DCI may be transmitted through a UE-specific PDCCH, and the second DCI may be transmitted through a group-common PDCCH.

According to an embodiment of the disclosure, a group-common SPS configuration may be activated through a UE-specific PDCCH. Further, as described above, because the unicast SPS may be activated through the UE-specific PDCCH, in the case that a signal for SPS activation is transmitted through the UE-specific PDCCH, it is necessary to define which RNTI to use for scrambling the SPS PDSCH transmitted after SPS activation.

According to an embodiment of the disclosure, in the case that the CRC and DCI scrambled with the CS-RNTI configured to the UE are transmitted through the UE-specific PDCCH to activate the SPS PDSCH, scrambling of the SPS PDSCH may be determined based on HARQ process number field values included in the DCI.

When the sps-ConfigIndex corresponding to the HARQ process number field corresponds to unicast SPS configuration, the SPS PDSCH may be scrambled based on a CS-RNTI (CS-RNTI for a unicast SPS or UE-specific CS-RNTI). More specifically, when the activated sps-ConfigIndex corresponds to the unicast SPS configuration, the SPS PDSCH may be scrambled based on a factor in which a CS-RNTI (CS-RNTI for unicast SPS or UE-specific CS-RNTI) is initialized using Equation 3.

When the sps-ConfigIndex corresponding to the HARQ process number field corresponds to a group-common SPS configuration, the SPS PDSCH may be scrambled based on the group common CS-RNTI (G-CS-RNTI). More specifically, when the activated sps-ConfigIndex corresponds to a group-common SPS configuration, the SPS PDSCH may be scrambled using a factor in which the group common CS-RNTI is initialized using Equation 3.

According to an embodiment of the disclosure, the unicast SPS configuration and the group-common SPS configuration may not may be transmitted through the same information element (IE) but each may be transmitted through separate IEs. Sps-ConfigIndexes used for the unicast SPS configuration and sps-ConfigIndexes used for the group-common SPS configuration may not have a common value. Alternatively, according to an embodiment of the disclosure, at least some bits (e.g., MSB 1 bit or LSB 1 bit) of the HARQ process number field included in DCI indicating SPS activation may indicate whether the sps-ConfigIndex indicated through the remaining bits except for the some bits is a unicast SPS or a group-common SPS and determine a factor used for generating a sequence used for scrambling of the SPS PDSCH according to the indication. Alternatively, DCI may include a separate 1-bit field for indicating whether the sps-ConfigIndex is a unicast SPS or a group-common SPS. Alternatively, if 1-bit information is included in the DCI according to whether a 1-bit field is included in the DCI, it may indicate that the sps-ConfigIndex is for a group-common SPS configuration (or for a unicast SPS configuration).

According to an embodiment of the disclosure, at least some bits (e.g., MSB 1 bit or LSB 1 bit) of a field indicating an sps-ConfigIndex included in an MAC CE (control element) indicating SPS activation may indicate whether the sps-ConfigIndex indicated through the remaining bits except for the some bits is a unicast SPS or a group-common SPS and determine a factor used for generating a sequence used for scrambling of the SPS PDSCH according to the indication. Alternatively, the MAC CE may include a separate 1-bit field for indicating whether the sps-ConfigIndex is a unicast SPS or a group-common SPS. Alternatively, if 1-bit information is included in the MAC CE according to whether a separate 1-bit field is included in the MAC CE, it may indicate that the sps-ConfigIndex is for a group-common SPS configuration (or for a unicast SPS configuration).

The unicast SPS configurations may be configured, as illustrated in Table 22 described above, and the group-common SPS configuration may be configured separately, as illustrated in Table 23 below. The group-common SPS configuration may include at least some of the parameters included in Table 23. In this case, the group-common SPS configuration may be expressed in various terms for indicating that it is for group communication. In the disclosure, for example, it is expressed as an MBS-SPS-Config, but the disclosure is not limited thereto, and the unicast SPS configuration and the group-common SPS configuration may be referred to as a first SPS configuration and a second SPS configuration, respectively.

TABLE 23

```
MBS-SPS-Config information element
SPS-Config ::=                                          SEQUENCE {
periodicity ENUMERATED {ms10, ms20, ms32, ms40, ms64, ms80, ms128, ms160, ms320, ms640,
spare6, spare5, spare4, spare3, spare2, spare1},
nrofHARQ-Processes                                      INTEGER (1..8),
n1PUCCH-AN PUCCH-ResourceId OPTIONAL,                    -- Need M
mcs-Table ENUMERATED {qam64LowSE} OPTIONAL,                      -- Need S
...,
[[
sps-ConfigIndex-r16 SPS-ConfigIndex-r16 OPTIONAL,                -- Cond SPS-List
harq-ProcID-Offset-r16 INTEGER (0..15) OPTIONAL,                 -- Need R
periodicityExt-r16 INTEGER (1..5120) OPTIONAL,                   -- Need R
pdsch-AggregationFactor-r16 ENUMERATED {n1, n2, n4, n8 } OPTIONAL       -- Need S
]]
}
```

In the disclosure, the case that sps-ConfigIndexes of a unicast SPS configuration and a group-common SPS configuration do not have common values has been described as an example, but the scope of the disclosure is not limited thereto. As described above, in the case that the unicast SPS configuration and the group-common SPS configuration are configured through separate IEs, the sps-ConfigIndex in the unicast SPS configuration and the group-common SPS configuration may have indexes corresponding to from 0 (the number of SPS configurations included in the SPS-List−1) or from 1 (the number of SPS configurations included in the SPS-List). In this case, the SPS-List for a unicast SPS configuration and the SPS-List for a group-common SPS configuration may be configured separately, and the SPS-List for a unicast SPS configuration and the SPS-List for a group-common SPS configuration may include SPS configurations of different numbers. In this case, DCI may include 1-bit information indicating whether an sps-ConfigIndex is for group-common SPS configuration or a unicast SPS configuration. Alternatively, when DCI includes specific 1-bit information, it may indicate that the sps-ConfigIndex is for a group-common SPS configuration (or for a unicast SPS configuration). Alternatively, as described above, it may indicate whether the sps-ConfigIndex is for a group-common SPS configuration or a unicast SPS configuration using a part (MSB or LSB) of the HARQ process number field.

The unicast SPS configuration and the group-common SPS configuration may belong to the same information element (IE) and be transmitted through the configuration illustrated in Table 22. In this case, sps-ConfigIndexes used for a unicast SPS configuration and sps-ConfigIndexes used for the group-common SPS configuration within the same IE may not have common values.

The above-described unicast SPS configuration and group-common SPS configuration may be configured to the UE through an upper layer or system information.

Figure 13:
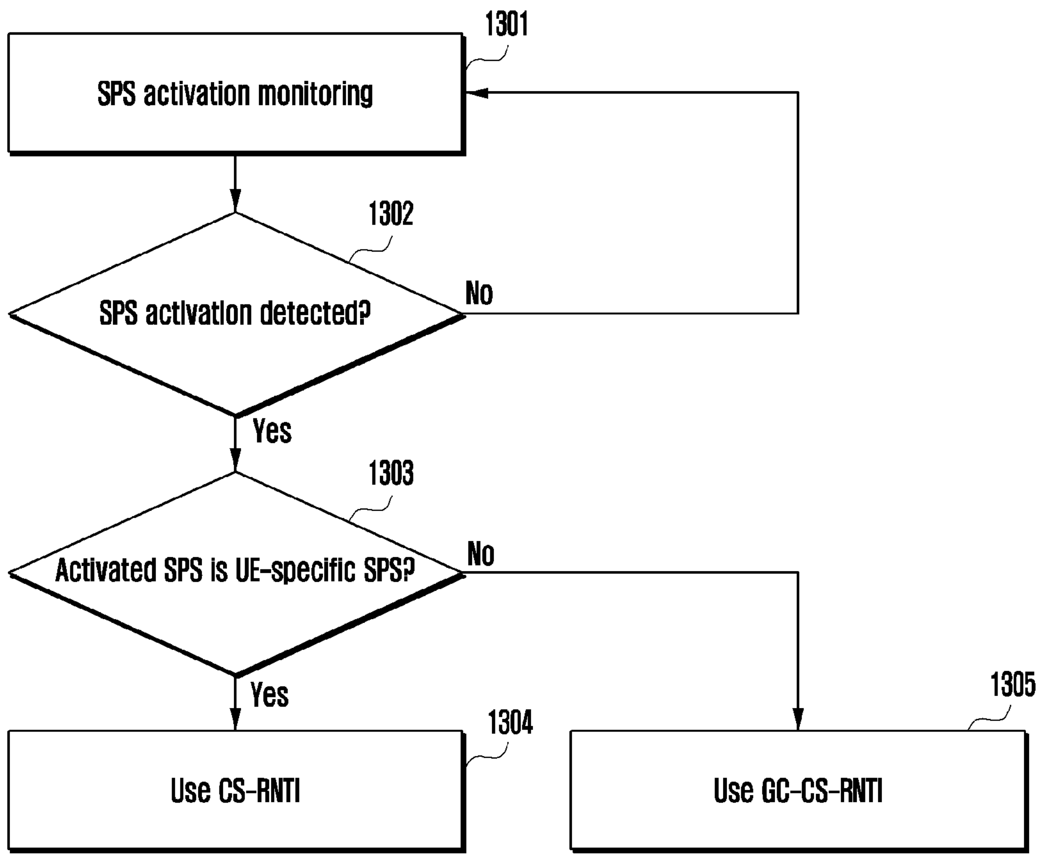
FIG. 13 is a flowchart illustrating an example operation of a terminal according to various embodiments.

FIG. 13 is a flowchart illustrating an example operation of a UE according to various embodiments.

The UE may receive SPS configuration information from the base station. The SPS configuration may include a unicast SPS configuration and a group-common SPS configuration. The SPS configuration information may be transmitted through higher layer signaling (e.g., RRC signaling or SIB).

The UE may monitor an SPS activation signal (1301). In this case, the SPS activation signal may include at least one of DCI or MAC CE.

The UE may monitor the SPS activation signal transmitted through the PDCCH in at least one search space according to the above embodiments. Alternatively, the UE may monitor the SPS activation signal transmitted through the PDSCH using the MAC CE (1301). The monitoring process may be a process including determination on whether an SPS activation condition according to the above-described embodiments is satisfied. A CRC of DCI transmitted through the monitored PDCCH may be scrambled using a CS-RNTI.

In the case that an SPS activation signal is detected as a result of the monitoring (1302), the UE may identify the SPS configuration based on information included in the SPS activation signal. That is, the UE may identify the SPS configuration of an sps-ConfigIndex corresponding to the information included in the SPS activation signal. The UE may identify whether the identified SPS configuration (or sps-ConfigIndex) corresponds to a unicast SPS configuration or a group-common SPS configuration (1303).

For example, the UE may identify (or read) a value of the HARQ process number field (HPN field) included in the DCI transmitted through the PDCCH, and identify whether the sps-ConfigIndex corresponding to the value corresponds to the unicast SPS configuration or the group-common SPS configuration. And/or, the UE may read a value of some fields included in the MAC CE transmitted through the PDSCH and determine whether the sps-ConfigIndex corresponding to the value corresponds to a unicast SPS configuration or a group-common SPS configuration.

As a result of the above process, in the case that the sps-ConfigIndex corresponds to the unicast SPS configuration, the UE may descramble SPS PDSCHs activated and transmitted by the activation signal using a CS-RNTI (UE-specific CS-RNTI). That is, the UE may understand that the SPS PDSCHs activated and transmitted by the activation signal are scrambled using a factor initialized using the CS-RNTI (UE-specific CS-RNTI), and operate (descramble) (1304).

As a result of the above process, in the case that the sps-ConfigIndex corresponds to the group-common SPS configuration, the UE may descramble the SPS PDSCHs activated and transmitted by the activation signal using the group common CS-RNTI (GC-CS-RNTI). That is, the UE may understand that the SPS PDSCHs activated and transmitted by the activation signal are scrambled using a factor initialized using the group common CS-RNTI (GC-CS-RNTI) and operate (descramble) (1305).

Figure 14:
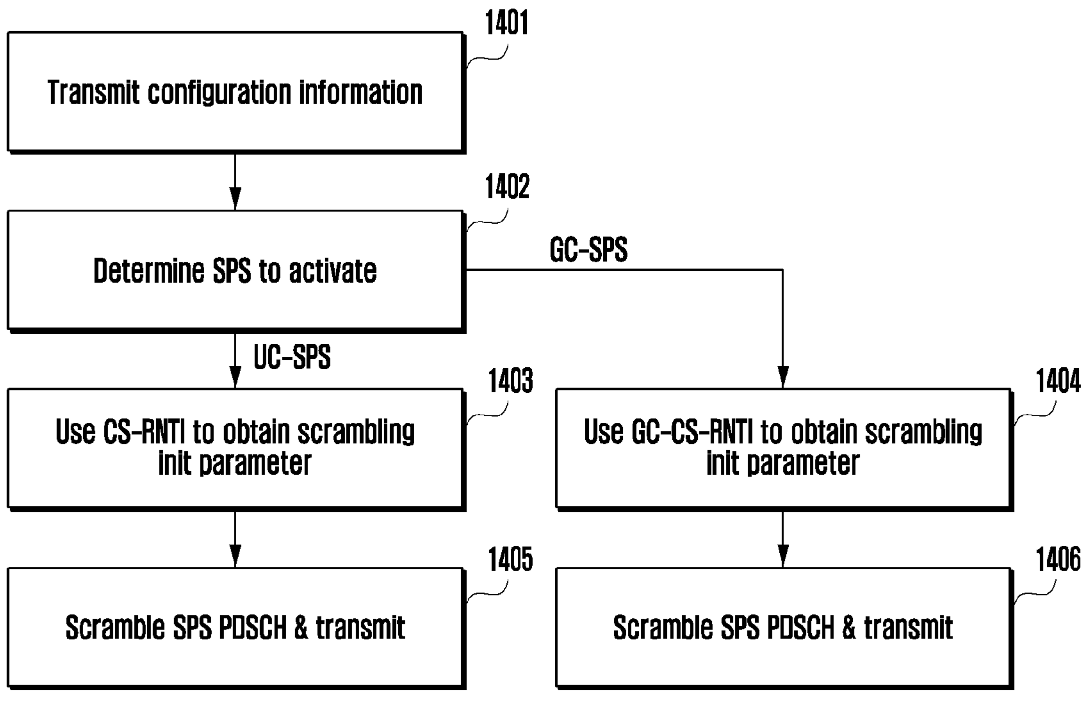
FIG. 14 is a flowchart illustrating an example operation of a base station according to various embodiments.

FIG. 14 is a flowchart illustrating an example operation of a base station according to various embodiments.

The base station may transmit SPS configuration information to the UE. The SPS configuration may include a unicast SPS configuration and a group-common SPS configuration (1401). The SPS configuration information may be transmitted through higher layer signaling (e.g., RRC signaling or SIB).

The base station may determine an SPS configuration to be activated among the configured SPS configurations. Specifically, the base station may determine whether to activate a unicast SPS configuration or a group-common SPS configuration, and determine a corresponding SPS configuration (1402).

Further, the base station may determine an sps-ConfigIndex of the determined SPS configuration and information corresponding thereto. The base station may activate an SPS configuration through DCI, determine a value of an HARQ process number field (HPN field), and transmit an SPS activation signal. The base station may activate an SPS configuration through an MAC CE transmitted through a PDSCH, and values of at least some fields of the MAC CE may be determined as values corresponding to sps-ConfigIndex corresponding to the SPS configuration to be activated.

In the case that the SPS configuration to be activated corresponds to the unicast SPS configuration, the base station may scramble and transmit the SPS PDSCH using a CS-RNTI. Specifically, the base station may initialize parameters for acquiring a scrambling sequence using a UE-specific CS-RNTI (1403) and scramble and transmit the SPS PDSCH using the scrambling sequence (1405).

In the case that the SPS configuration to be activated corresponds to the group-common SPS configuration, the base station may scramble and transmit the SPS PDSCH using a group common CS-RNTI (GC-CS-RNTI). Specifically, the base station may initialize parameters for obtaining a scrambling sequence using the group common CS-RNTI (1404) and scramble and transmit the SPS PDSCH using the scrambling sequence (1406).

3. Related to Retransmission of Activation Signal

According to an embodiment of the disclosure, the base station may configure at least one group-common SPS(s) to UEs and transmit a signal activating at least one of the group-common SPSs through a group-common PDCCH to UEs. The base station may receive feedback on reception of the group-common SPS PDSCH to determine whether at least one of the UEs belonging to the group has not received the activation signal of the group-common SPS. Specifically, in the case that the base station does not receive feedback on reception of the group-common SPS PDSCH from at least one of the UEs belonging to the group, the base station may determine that the activation signal of the group-common SPS has not been received. The base station may retransmit the SPS activation signal to the UE that has failed to receive the SPS activation signal through at least one of a UE-specific PDCCH, a group common PDCCH, or a MAC CE.

According to an embodiment of the disclosure, resources for feedback of the UEs may be included in the group-common SPS configuration, for example, a PUCCH-ResourceId may be included in the group-common SPS configuration, and the PUCCH-ResourceId may indicate one of UE-specifically configured PUCCH-Resources.

According to an embodiment of the disclosure, resources for feedback of the UEs may be included in the group-common SPS configuration, and for example, the group-common SPS configuration may include a PUCCH-ResourceId, and the PUCCH-ResourceId may indicate one of PUCCH-Resources commonly configured to the UE belonging to the group. Alternatively, a PUCCH-Resource Id included in the group-common SPS configuration may indicate one of UE-specifically configured PUCCH-Resources.

Accordingly, feedback information on whether an SPS PDSCH is received for each UE may be transmitted to the base station.

The base station may configure a UE-specific PUCCH transmission timing offset (e.g., configures an $offset_1$ value and transmits to $n+offset_1$ instead of a slot n that should transmit a PUCCH determined through the SPS activation signal) or/and configure frequency domain offset of a PUCCH transmission resource (e.g., configures an $offset_2$ value and configures and transmits a startingPRB to $m+offset_2$ when the startingPRB of the PUCCH-ResourceId is m). Alternatively, in order to configure PUCCH transmission timing to the UE, the base station may transmit PUCCH configuration information including at least one of time offset, frequency offset, or period information to the UE. In this case, the base station may configure at least one PUCCH configuration information to the UE (e.g., may be configured in the form of a list), and include information (e.g., referred to as timing information) indicating any one of the PUCCH configuration information in the SPS activation signal, and the UE may indicate a resource to transmit feedback. However, in the case that the SPS activation signal does not include information indicating any one of PUCCH configuration information, the UE may transmit feedback using PUCCH configuration information configured as the default.

Information related to PUCCH transmission resources (e.g., timing, and the like) may be included in the SPS activation signal without a configuration through a higher layer.

According to an embodiment of the disclosure, as HARQ feedback of the UE for the group-common SPS PDSCH, only ACK/NACK-based feedback (e.g., ACK if decoding is successful and NACK if decoding fails) may be allowed, and NACK only feedback (e.g., feedback is not performed if decoding is successful, and NACK is fed back only if decoding fails) may not be allowed (configured).

Figure 15:
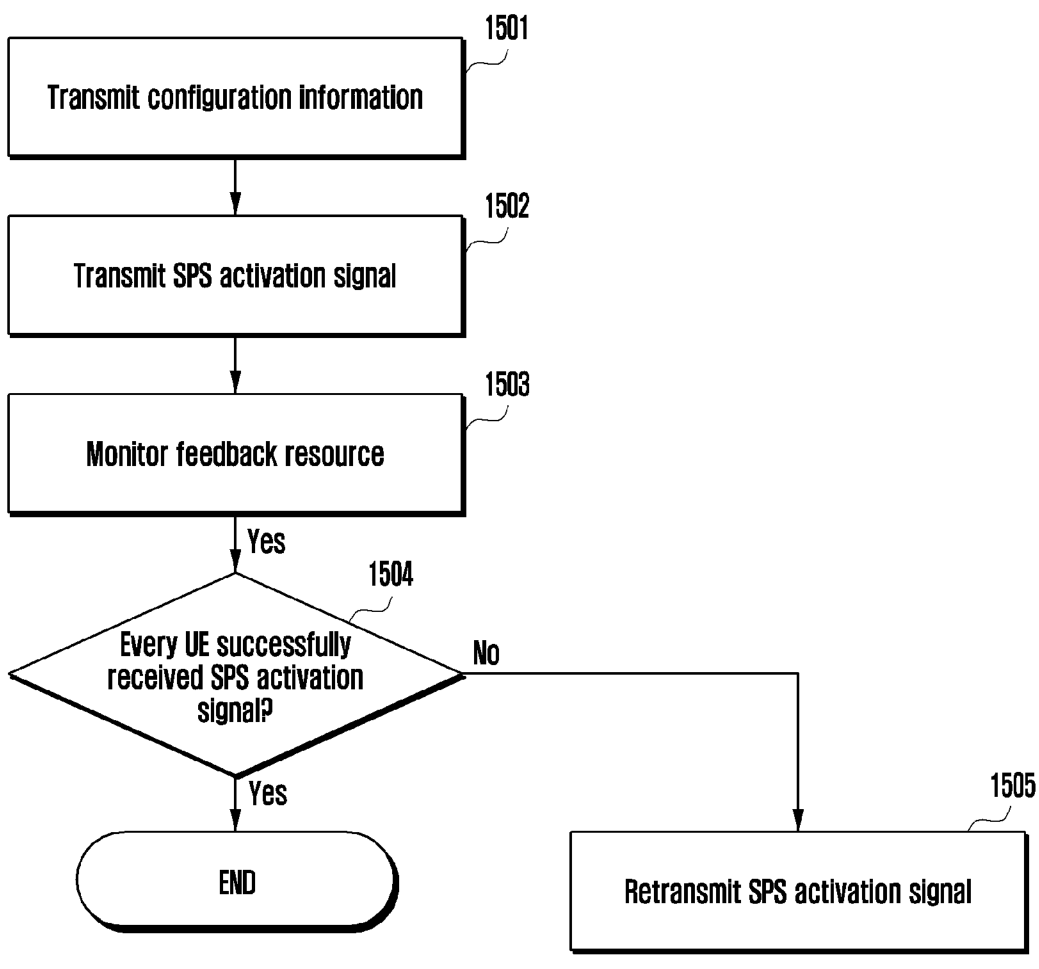
FIG. 15 is a flowchart illustrating an example operation of a base station according to various embodiments.

FIG. 15 is a flowchart illustrating an example operation of a base station according to various embodiments.

The base station may transmit SPS configuration information to the UE. The SPS configuration may include a unicast SPS configuration and a group-common SPS configuration (1501). The configuration information may include resource related configurations for feedback of the above-described group-common SPS. The SPS configuration information may be transmitted through higher layer signaling (e.g., RRC signaling or SIB).

The base station may transmit a group-common SPS activation signal for activating at least one of the configured group-common SPS configurations using a group common signal (e.g., a group common PDCCH or a MAC CE transmitted through a group common PDSCH) (1502). Alternatively, the base station may transmit a group-common SPS activation signal activating at least one of group-common SPS configurations using a UE specific signal (e.g., a UE specific PDCCH or a MAC CE transmitted through a UE specific PDSCH). A specific method of activating the group-common SPS configuration using the UE-specific signal follows the above description. Accordingly, according to the disclosure, the contents of FIGS. 13 and 14 may be applied in combination with a method of retransmitting an SPS activation signal.

After activating the SPS, the base station may transmit the group common PDSCH to a predetermined resource according to the above-described embodiments. The base station may monitor feedback of the UE(s) in a determined resource based on the SPS configuration and at least some of the embodiments (1503).

The base station may determine whether all UEs belonging to the group have successfully received the SPS activation signal through the feedback (1504).

In the case that feedback information is received from all UEs belonging to the group, the base station may determine that all UEs belonging to the group have successfully received the SPS activation signal. Therefore, in the case that the base station determines that at least one UE has not received the SPS PDSCH based on the feedback information received from the UEs (e.g., in the case that a NACK is received), the base station may retransmit the SPS PDSCH. In this case, the base station may retransmit the SPS PDSCH through a UE-specific SPS PDSCH or a group-common SPS PDSCH. In this case, the resource for SPS retransmission may use an activated SPS configuration, a separate SPS configuration may be configured to the UE for retransmission or information on resource assignment for retransmission may be transmitted through the PDCCH. In this case, information on resource assignment for retransmission may be included in DCI, and a resource may be allocated using a method of configuring resource assignment information of the existing DCI formats 1_1 to 1_3.

In the case that feedback is not received from at least one of UEs belonging to the group, the base station may determine that the UE has not received the SPS activation signal. Accordingly, the base station may retransmit the SPS activation signal (1505). Further, in the case that a NACK is received from a UE that has received feedback among UEs belonging to the group, the base station may retransmit the SPS PDSCH. In this case, the base station may retransmit the SPS PDSCH through a UE-specific SPS PDSCH or a group-common SPS PDSCH. In this case, the resource for the SPS retransmission may use an activated SPS configuration, a separate SPS configuration may be configured to the UE for retransmission, or information on resource assignment for retransmission may be transmitted through the PDCCH. In this case, information on resource assignment for retransmission may be included in DCI, and a resource may be allocated using a method of configuring resource assignment information of the existing DCI formats 1_1 to 1_3.

Figure 16:
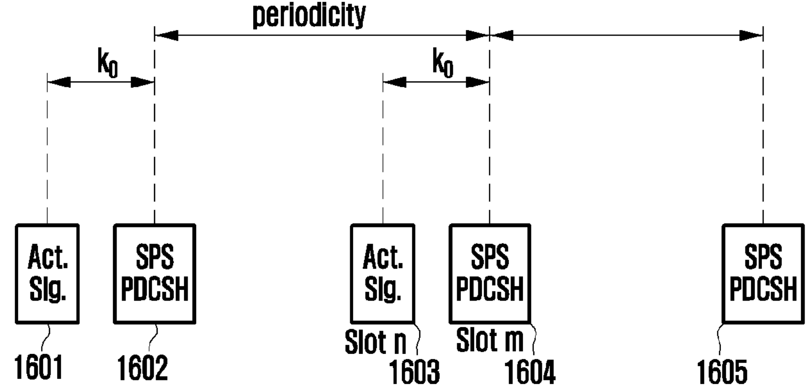
FIG. 16 is a diagram illustrating an example retransmitted SPS activation signal and timing of an SPS PDSCH according to various embodiments.

FIG. 16 is a diagram illustrating an example retransmitted SPS activation signal and timing of an SPS PDSCH according to various embodiments.

The base station may transmit an SPS activation signal 1601 and transmit SPS PDSCHs 1602, 1604, and 1605 according to SPS PDSCH transmission timing determined by Equation 7. The base station may retransmit an SPS activation signal 1603 based on a feedback signal of the SPS PDSCH. That is, in the case that the feedback signal for the SPS PDSCH is not received, the base station may retransmit the SPS activation signal.

According to an embodiment of the disclosure, a slot of the retransmitted SPS activation signal 1603 is configured to a slot n, and a $K_0$ value included in the retransmitted SPS activation signal (as described above, all a method in which $K_0$ value candidates may be configured through higher layer signaling, a method in which any one thereof may be indicated through an SPS activation signal, or a method in which the $K_0$ value itself is included in the activation signal may be used), and a relationship such as $n+K_0=m$ may be established between the SPS activation signal and an SPS PDSCH transmission slot m 1604 determined by Equation 7.

Accordingly, in order to satisfy the above relationship, the base station may first determine the SPS PDSCH transmission slot m, first determine a retransmission slot n of the SPS activation signal according to this, and determine a $K_0$ value included in the SPS activation signal. Alternatively, the base station may first determine a $K_0$ value included in the SPS activation signal and then determine a retransmission slot n of the SPS activation signal. The retransmitted SPS activation signal may be transmitted through a PDCCH as DCI or transmitted through a PDSCH as an MAC CE.

In the case that the retransmitted SPS activation signal is transmitted as a higher layer signal (e.g., MAC CE), a processing time for this may be further required.

According to an embodiment of the disclosure, a UE that has a processing time (hereinafter, proc_time or processing time) for a higher layer signaling signal and that has received an SPS activation signal through a higher layer signal in a slot n is may receive and decode SPS PDSCHs in which a start boundary of a first symbol of the SPS PDSCH among SPS PDSCHs existing after the activation signal satisfies a condition existing after a slot n+proc_time and transmit feedback thereto to the base station. The UE may not receive SPS PDSCHs that do not satisfy the above condition, that is, in which a start boundary of the first symbol of the SPS PDSCH is located before a slot n+proc_time, and may not transmit feedback thereto.

According to an embodiment of the disclosure, a base station that has transmitted an SPS activation signal through a higher layer signal in a slot n with a higher layer signaling processing time proc_time may monitor feedback of UEs for SPS PDSCHs in which a start boundary of a first symbol of the SPS PDSCH satisfies the condition existing after n+proc_time among SPS PDSCHs existing after the activation signal. The base station may not monitor feedback of UEs for SPS PDSCHs that do not satisfy the above condition, that is, in which a start boundary of a first symbol of the SPS PDSCH is located before n+proc_time.

According to an embodiment of the disclosure, as the proc_time, for example, a value configured by the base station may be used, be configured during a UE capability exchange process with a different value according to a processing capability of the UE, be defined on a standard basis to be stored in memory in a manufacturing process of each of the base station and the UE, or configured to operate in HW. For example, the proc_time may have the same value as $$3N_{slot}^{subframe,\mu}.$$

According to an embodiment of the disclosure, in the case that the SPS activation signal is transmitted through the MAC CE, an MAC CE application time point (e.g., a starting point of HARQ-ACK feedback operation and reception and decoding of the SPS PDSCH) may be a first slot after $$k+3N_{slot}^{subframe,\mu}$$

when a slot transmitting a HARQ-ACK for the PDSCH through which the MAC CE is transmitted is k. That is, the UE may receive and decode SPS PDSCHs located in a slot(s) satisfying the above condition (e.g., when a HARQ-ACK for a PDSCH including the MAC CE is transmitted in a slot k, slots after $$3N_{slot}^{subframe,\mu}$$

transmit feedback thereto to the base station, but may not be received SPS PDSCHs located in a slot(s) that do not satisfy the above conditions, or may not decode the SPS PDSCHs even if the SPS PDSCHs are received, and may not transmit feedback thereto.

The slot k may be indicated through a 'PDSCH-to-HARQ_feedback timing indicator' field ($k_1$ value) included in DCI transmitted through a PDCCH scheduling a PDSCH including the MAC CE. If the PDSCH-to-HARQ_feedback timing indicator field does not exist, it may be indicated with one value ($k_1$ value) configured to RRC.

Figure 17A:
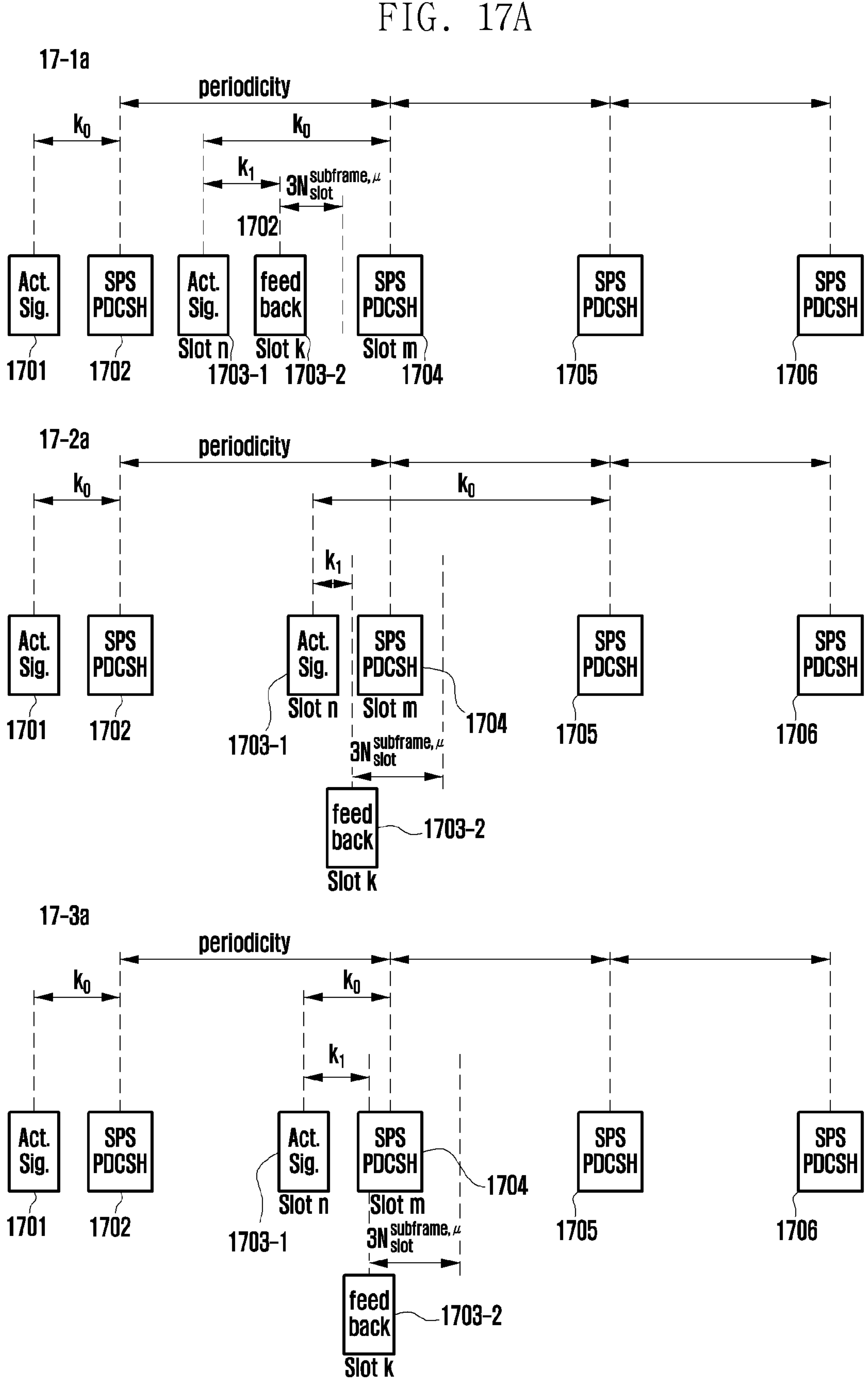
FIG. 17A is a diagram illustrating an example retransmitted SPS activation signal and timing of an SPS PDSCH according to various embodiments.
Figure 17B:
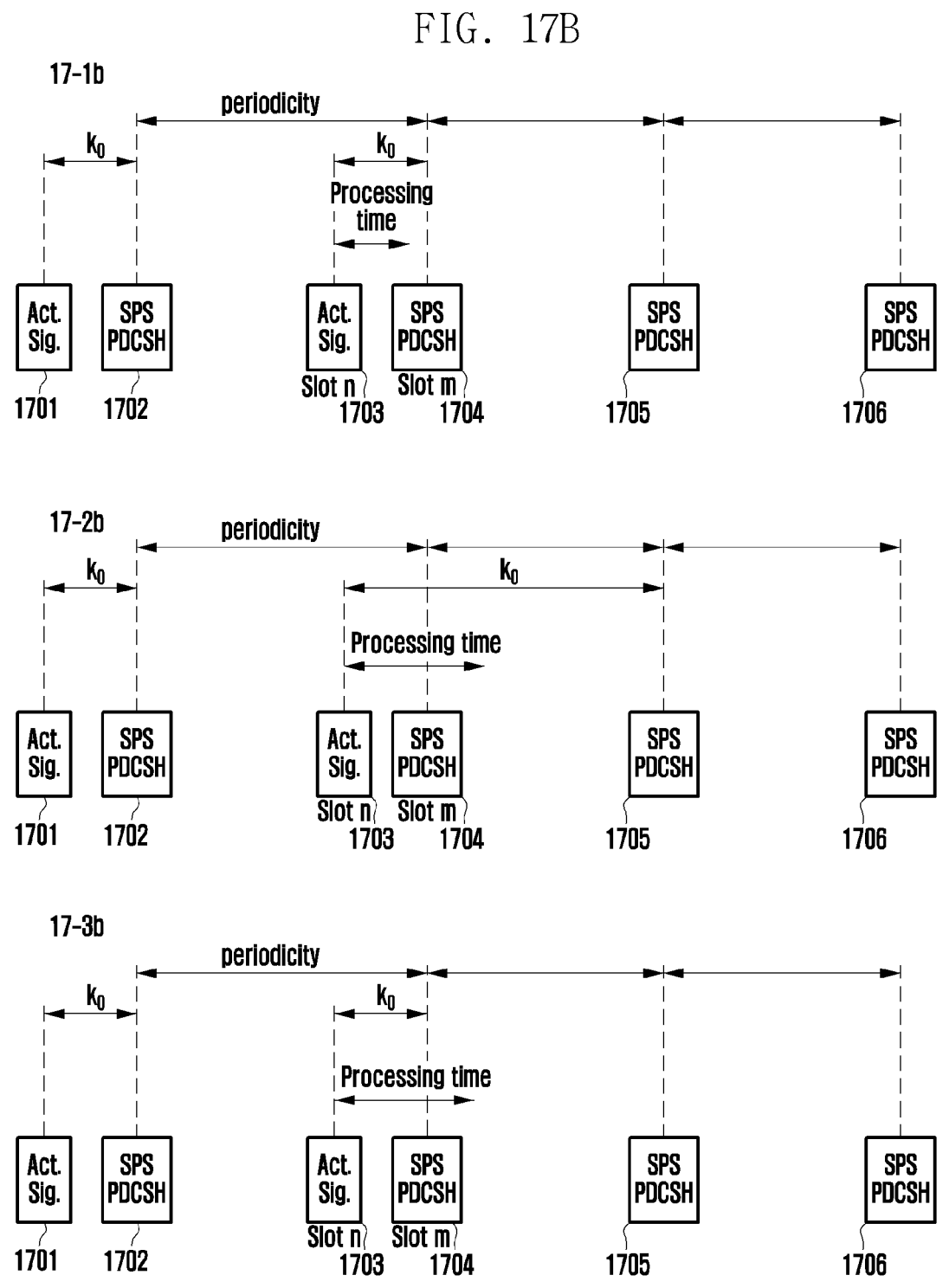

FIGS. 17A and 17B are diagrams illustrating an example retransmitted SPS activation signal and timing of an SPS PDSCH according to an embodiment of the disclosure.

According to the above-described embodiment, with reference to 17-1*a* of FIG. 17A and 17-1*b* of FIG. 17B, the UE that has received the SPS activation signal (DCI transmitted through a PDCCH or a MAC CE transmitted through higher layer signaling) may receive and decode SPS PDSCHs 1702, 1704, 1705, and 1706 that satisfy the above conditions, and provide feedback thereto. In the case that the UE does not receive the SPS activation signal according to feedback transmission, the base station may retransmit the SPS activation signal (1703, 1703-1), and as described above, a slot of the retransmitted SPS activation signal may be determined based on a slot m 1704 of the SPS PDSCH and K0 determined by the SPS activation signal.

Further, as described above, in the case of transmitting the SPS activation signal through the MAC CE, a processing time may be considered, and with reference to 17-1*a* of FIG. 17A, the base station may determine a slot 1703 to transmit an activation signal in consideration of the processing time according to transmission of the SPS activation signal. Further, with reference to 17-1*b* of FIG. 17B, the base station may determine a slot 1703 to transmit an activation signal in consideration of a processing time after receiving feedback information 1703-1 of the UE.

With reference to 17-2*a* or 17-3*a* of FIG. 17A, for a slot n 1703 in which an activation signal is received, the UE may not receive (or cannot receive) an SPS PDSCH transmitted from a slot before a processing time (e.g., slot n+slot before a processing time) (1704) or may receive and decode the SPS PDSCH, but may not provide feedback thereto. Further, the UE may receive and decode the SPS PDSCHs 1705 and 1706 received after the processing time, and provide feedback thereto.

Further, with reference to 17-2*b* or 17-3*b* of FIG. 17B, for a slot n 1703 in which the activation signal is received, the UE may not receive (or cannot receive) an SPS PDSCH 1704 transmitted from a slot before a processing time after a slot k 1703-2 in which the feedback signal is transmitted (e.g., slot k+processing time or slot n+K1+processing time) or receive and decode the SPS PDSCH, but may not provide feedback thereto. Further, the UE may receive and decode SPS PDSCHs 1705 and 1706 received after the processing time and provide feedback thereto.

4. UE Re-Initialize

According to the embodiments of the disclosure, in the case that the group-common SPS activation signal is retransmitted, the UE that has already successfully received the group-common SPS activation signal may re-receive the group-common SPS activation signal. Upon receiving the SPS activation signal, the UE is supposed to (re-)initialize configured downlink assignment of the corresponding serving cell; thus, inefficiency may occur in processing of data transmitted through the SPS PDSCH that was received and processed before retransmission (e.g., data waiting to be retransmitted after transmitting NACK).

According to an embodiment of the disclosure, in the case that the UE that has successfully received a group-common SPS activation signal re-receives the group-common SPS activation signal, the UE may discard the re-received signal. That is, the UE may not (re-)initialize configured downlink assignment of the corresponding serving cell.

According to an embodiment of the disclosure, in the case that the UE that has successfully received a group-common SPS activation signal 1 re-receives the group-common SPS activation signal 2, and in the case that contents (e.g., FDRA, TDRA, MCS, and the like) of the signal 1 and the signal 2 are the same, the UE may discard the signal 2. That is, the UE may not (re-)initialize configured downlink assignment of the corresponding serving cell.

According to an embodiment of the disclosure, in the case that the UE that has successfully received a group-common SPS activation signal re-receives the group-common SPS activation signal, the UE may not flush an HARQ buffer containing data transmitted through the SPS PDSCH received before the retransmitted SPS activation signal, and in the case that the base station retransmits the data, the UE may receive and process the data.

According to an embodiment of the disclosure, in the case that the UE that has already successfully received the group-common SPS activation signal 1 re-receives the group-common SPS activation signal 2, and in the case that at least part of contents (e.g., FDRA, TDRA, MCS, and the like) of the signal 1 and the signal 2 are different, the UE may (re-)initialize configured downlink assignment of the corresponding serving cell based on this, but may not flush a HARQ buffer containing data transmitted through the SPS PDSCH received before the signal 2, and in the case that the base station retransmits the data, the UE may receive and process the data.

According to an embodiment of the disclosure, retransmission DCI of the group-common SPS activation signal may be transmitted through a UE-specific PDCCH, or the retransmission MAC CE of the group-common SPS activation signal may be transmitted through a UE-specific PDSCH; thus, it may be avoided that the UE that has already received a group-common SPS activation signal repeatedly receives the group-common SPS activation signal.

A method of a UE according to an example embodiment of the disclosure includes: receiving semi persistent scheduling (SPS) configuration information from a base station, monitoring an SPS activation signal; identifying, based on the SPS activation signal being detected, an SPS configuration corresponding to the SPS activation signal based on the SPS configuration; receiving a physical downlink shared channel (PDSCH) from the base station based on the SPS configuration; descrambling, based on the SPS configuration being a group-common SPS configuration, the PDSCH based on a group common configured scheduling radio network temporary identifier (CS-RNTI); and descrambling, based on the SPS configuration being a UE-specific SPS configuration, the PDSCH based on the UE-specific CS-RNTI.

A method of a base station according to an example embodiment of the disclosure includes: transmitting semi persistent scheduling (SPS) configuration information to a UE; transmitting an SPS activation signal to the UE; and transmitting a physical downlink shared channel (PDSCH) using an SPS configuration corresponding to the SPS activation signal identified based on the SPS configuration information, wherein based on the SPS configuration being a group-common SPS configuration, the PDSCH is scrambled based on a group common configured scheduling radio network temporary identifier (CS-RNTI), and based on the SPS configuration being the UE-specific SPS configuration, the PDSCH is scrambled based on the UE-specific CS-RNTI.

A UE according to an example embodiment includes: a transceiver; and a controller connected to the transceiver and configured to: receive semi persistent scheduling (SPS) configuration information from a base station, monitor an SPS activation signal, identify an SPS configuration corresponding to the SPS activation signal based on the SPS configuration information based on the SPS activation signal being detected, receive a physical downlink shared channel (PDSCH) from the base station based on the SPS configuration, descramble the PDSCH based on a group common configured scheduling radio network temporary identifier (CS-RNTI) based on the SPS configuration being a group-common SPS configuration, and to descramble the PDSCH based on a UE-specific CS-RNTI based on the SPS configuration being a UE-specific SPS configuration.

A base station according to an example embodiment includes: a transceiver; and a controller connected to the transceiver and configured to: transmit semi persistent scheduling (SPS) configuration information to a UE, transmit an SPS activation signal to the UE, and transmit a physical downlink shared channel (PDSCH) using an SPS configuration corresponding to the SPS activation signal identified based on the SPS configuration information, wherein based on the SPS configuration being a group-common SPS configuration, the PDSCH is scrambled based on a group common configured scheduling radio network temporary identifier (CS-RNTI), and based on the SPS configuration being a UE-specific SPS configuration, the PDSCH is scrambled based on the UE-specific CS-RNTI.

Figure 18:
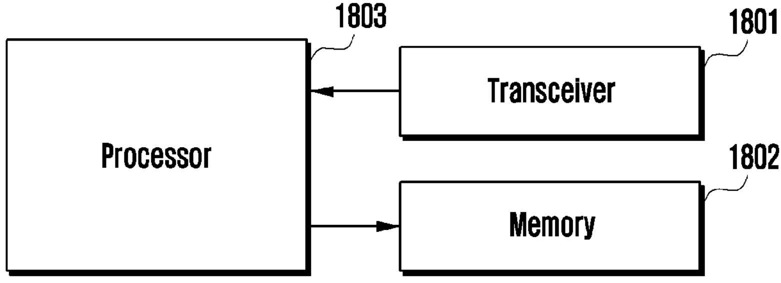
FIG. 18 is a block diagram illustrating an example configuration of a terminal according to various embodiments.

FIG. 18 is a block diagram illustrating an example configuration of a UE according to various embodiments.

With reference to FIG. 18, the UE may include a transceiver 1801, a controller or processor (e.g., including processing circuitry) 1803, and a memory 1802. In the disclosure, the controller may include a circuit, an application-specific integrated circuit, or at least one processor.

The transceiver 1801 may include various circuitry and transmit and receive signals to and from other network entities. The transceiver 1801 may receive, for example, SPS configuration information from the base station, and the configuration information may be received through RRC signaling, MIB, or SIB. Further, the configuration information may include information on a BWP and information on a mcs-Table. The transceiver 1801 may receive a group common PDCCH, DCI through the group common PDCCH, DCI through a UE-specific PDCCH, or an MAC CE. The DCI or MAC CE may be a signal for activating the SPS. Further, in the case that the SPS activation signal is not received, the transceiver 1801 may receive the retransmitted SPS activation signal. The transceiver 1801 may receive data from the base station. The transceiver 1801 may receive new transmission data or retransmission data from the base station through the SPS PDSCH. Further, the transceiver 1801 may perform signal transmission and reception of the UE of the disclosure described above.

The controller or processor 1803 may include various processing circuitry and control overall operations of the UE according to an embodiment of the disclosure. For example, the controller 1803 may control signal flow between blocks to perform an operation according to the flowchart described above. For example, the controller 1803 may receive an SPS activation signal and identify whether the SPS has been activated. Further, the controller 1803 may identify the activated SPS configuration based on the SPS activation signal. Further, the controller 1803 may receive the PDSCH from the base station based on the SPS configuration, and descramble the PDSCH based on a group common CS-RNTI in the case that the SPS configuration is a group-common SPS configuration, and descramble the PDSCH based on the UE-specific CS-RNTI in the case that the SPS configuration is a UE-specific SPS configuration. Further, in the case that the activation signal is received and then the same activation signal is received, the controller 1803 may discard the activation signal received later or may not reinitialize configured downlink allocation of a serving cell. Further, the above-described operation of the UE may be controlled by the controller 1803.

The memory 1802 may store at least one of information transmitted and received through the transceiver 1801 or information generated through the controller 1803.

Figure 19:
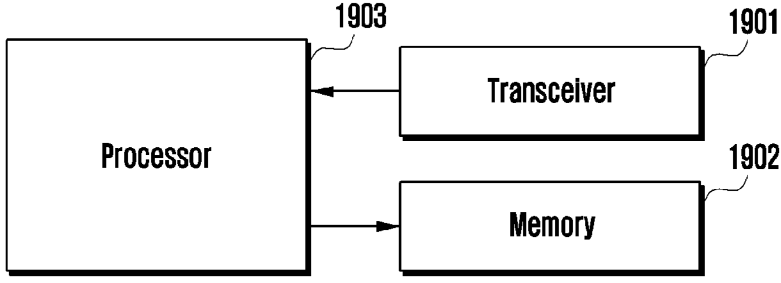
FIG. 19 is a block diagram illustrating an example configuration of a base station according to various embodiments.

FIG. 19 is a block diagram illustrating an example configuration of a base station according to an embodiment of the disclosure.

With reference to FIG. 19, the base station may include a transceiver 1901, a controller or processor (e.g., including processing circuitry) 1903, and a memory 1902. In the disclosure, the controller may be include a circuit, an application-specific integrated circuit, or at least one processor.

The transceiver 1901 may transmit and receive signals to and from other network entities. For example, the transceiver 1901 may transmit configuration information from the base station to the UE, and the configuration information may be transmitted through RRC signaling, MIB, or SIB. The configuration information may include information on a BWP and information on a mcs-Table. The transceiver 1901 may transmit a group common PDCCH, transmit DCI through the group common PDCCH, transmit DCI through a UE-specific PDCCH, or transmit MAC CE. The DCI or MAC CE may be a signal for activating the SPS. Further, the transceiver 1901 may retransmit the SPS activation signal. Further, the transceiver 1901 may transmit data to the UE. The transceiver 1901 may transmit new transmission data or retransmission data to the UE through the SPS PDSCH. Further, the transceiver 1901 may perform signal transmission and reception of the base station of the disclosure described above.

The controller or processor 1903 may include various processing circuitry and control overall operations of the UE according to an embodiment of the disclosure. For example, the controller 1903 may control signal flow between blocks to perform the operation according to the above-described flowchart. For example, the controller 1903 may transmit an SPS activation signal to activate the SPS configuration. Further, the controller 1903 may transmit the PDSCH to the UE based on the SPS configuration, and in the case that the SPS configuration is a group-common SPS configuration, the controller 1903 may scramble the PDSCH based on the group common CS-RNTI, and in the case that the SPS configuration is a UE-specific SPS configuration, the controller 1902 may scramble the PDSCH based on the UE-specific CS-RNTI. Further, in the case that it is determined that the UE has not received an activation signal, the controller 1903 may retransmit the activation signal. Further, the above-described operation of the base station may be controlled by the controller 1903.

The memory 1902 may store at least one of information transmitted and received through the transceiver 1901 or information generated through the controller 1903.

In the drawings for describing the method of the disclosure, the order of description does not necessarily correspond to the order of execution, and the precedence relationship may be changed or may be executed in parallel.

The drawings illustrating the method of the disclosure may omit some components and include only some components within the scope that does not impair the essence of the disclosure.

Further, the method of the disclosure may be implemented in a combination of some or all of the contents included in each embodiment within a range that does not impair the essence of the disclosure.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed by a terminal in a communication system, the method comprising:

receiving, from a base station, semi persistent scheduling (SPS) configuration information including a group-common SPS configuration and a user equipment (UE)-specific SPS configuration, wherein each of the group-common SPS configuration and the UE-specific SPS configuration includes an SPS configuration index;

monitoring an SPS activation signal;

identifying, based on the SPS activation signal being detected, an SPS configuration corresponding to the SPS activation signal based on the SPS configuration information;

receiving, from the base station, a physical downlink shared channel (PDSCH) based on the SPS configuration;

based on the SPS configuration being the group-common SPS configuration, descrambling the PDSCH based on a group common configured scheduling radio network temporary identifier (G-CS-RNTI); and based on the SPS configuration being the UE specific SPS configuration, descrambling the PDSCH based on a CS-RNTI, wherein the SPS configuration index for the UE-specific SPS configuration and the SPS configuration index for the group-common SPS configuration do not have a same value.

2. The method of claim 1, wherein the SPS activation signal includes downlink control information (DCI), and wherein a cyclic redundancy check (CRC) scrambled based on the CS-RNTI or the G-CS-RNTI is attached to the DCI.

3. The method of claim 2, wherein the SPS configuration corresponding to the SPS configuration index indicated by a field included in the DCI is activated, and wherein modulation and coding scheme (mcs)-Table information for a group-common SPS PDSCH reception is separate configuration information from a mcs-Table information for a UE-specific SPS PDSCH reception.

4. The method of claim 1, further comprising:

receiving retransmission of the SPS activation signal;

discarding the retransmission of the SPS activation signal, wherein the retransmission of the SPS activation signal is transmitted in a specific slot determined based on the SPS configuration.

5. A method performed by a base station in a communication system, the method comprising:

transmitting, to a terminal, semi persistent scheduling (SPS) configuration information including a group-common SPS configuration and a user equipment (UE)-specific SPS configuration, wherein each of the group-common SPS configuration and the UE-specific SPS configuration includes an SPS configuration index;

transmitting, to the terminal, an SPS activation signal; and transmitting a physical downlink shared channel (PDSCH) using an SPS configuration corresponding to the SPS activation signal identified based on the SPS configuration information, wherein based on the SPS configuration being ethe group-common SPS configuration, the PDSCH is scrambled based on a group common configured scheduling radio network temporary identifier (G-CS-RNTI), and based on the SPS configuration being the UE-specific SPS configuration, the PDSCH is scrambled based on a CS-RNTI, wherein the SPS configuration index for the UE-specific SPS configuration and the SPS configuration index for the group-common SPS configuration do not have a same value.

6. The method of claim 5, wherein the SPS activation signal includes downlink control information (DCI), and wherein a cyclic redundancy check (CRC) scrambled based on the CS-RNTI or the G-CS-RNTI is attached to the DCI.

7. The method of claim 6, wherein the SPS configuration corresponding to the SPS configuration index indicated by a field included in the DCI is activated, and wherein modulation and coding scheme (mcs)-Table information for a group-common SPS PDSCH reception is separate configuration information from a mcs-Table information for a UE-specific SPS PDSCH reception.

8. The method of claim 6, further comprising:

performing, based on feedback information on the PDSCH not being received, retransmission of the activation signal in a specific slot, wherein the specific slot is determined based on the SPS configuration.

9. A terminal in a communication system, the terminal comprising:

a transceiver; and a controller connected to the transceiver and configured to:

receive, from a base station, semi persistent scheduling (SPS) configuration information including a group-common SPS configuration and a user equipment (UE)-specific SPS configuration, wherein each of the group-common SPS configuration and the UE-specific SPS configuration includes an SPS configuration index, monitor an SPS activation signal, identify an SPS configuration corresponding to the SPS activation signal based on the SPS configuration information based on the SPS activation signal being detected, receive, from the base station, a physical downlink shared channel (PDSCH) based on the SPS configuration, descramble the PDSCH based on a group common configured scheduling radio network temporary identifier (G-CS-RNTI) based on the SPS configuration being the group-common SPS configuration, and descramble the PDSCH based on a CS-RNTI based on the SPS configuration being the UE-specific SPS configuration, wherein the SPS configuration index for the UE-specific SPS configuration and the SPS configuration index for the group-common SPS configuration do not have a same value.

10. The terminal of claim 9, wherein the SPS activation signal includes downlink control information (DCI), and wherein a cyclic redundancy check (CRC) scrambled based on the CS-RNTI or the G-CS-RNTI is attached to the DCI.

11. The terminal of claim 10, wherein the SPS configuration corresponding to the SPS configuration index indicated by a field included in the DCI is activated, and wherein modulation and coding scheme (mcs)-Table information for a group-common SPS PDSCH reception is separate configuration information from a mcs-Table information for a UE-specific SPS PDSCH reception.

12. The terminal of claim 9, wherein the controller is further configured to:

receive retransmission of the SPS activation signal, and discard the retransmission of the SPS activation signal, wherein the retransmission of the SPS activation signal is transmitted in a specific slot determined based on the SPS configuration.

13. A base station in a communication system, the base station comprising:

a transceiver; and a controller connected to the transceiver and configured to:

transmit, to a terminal, semi persistent scheduling (SPS) configuration information including a group-common SPS configuration and a user equipment (UE)-specific SPS configuration, wherein each of the group-common SPS configuration and the UE-specific SPS configuration includes an SPS configuration index, transmit, to the terminal, an SPS activation signal, and transmit a physical downlink shared channel (PDSCH) using an SPS configuration corresponding to the SPS activation signal identified based on the SPS configuration information, wherein based on the SPS configuration being the group-common SPS configuration, the PDSCH is scrambled based on a group common configured scheduling radio network temporary identifier (G-CS-RNTI), and wherein based on the SPS configuration being the UE-specific SPS configuration, the PDSCH is scrambled based on a CS-RNTI, wherein the SPS configuration index for the UE-specific SPS configuration and the SPS configuration index for the group-common SPS configuration do not have a same value.

14. The base station of claim 13, wherein the SPS activation signal includes downlink control information (DCI), and wherein a cyclic redundancy check (CRC) scrambled based on the CS-RNTI or the G-CS-RNTI is attached to the DCI.

15. The base station of claim 14, wherein the SPS configuration corresponding to the SPS configuration index indicated by a field included in the DCI is activated, and wherein modulation and coding scheme (mcs)-Table information for a group-common SPS PDSCH reception is separate configuration information from a mcs-Table information for a UE-specific SPS PDSCH reception.

* * * * *